(12) United States Patent
Kusaka et al.

(10) Patent No.: US 6,242,875 B1
(45) Date of Patent: Jun. 5, 2001

(54) MOTOR DRIVING APPARATUS

(75) Inventors: Satoshi Kusaka; Shunichi Kondoh, both of Tokyo (JP)

(73) Assignees: Mitsubishi Denki Kabushiki Kaisha; Mitsubishi Electric Engineering Co., Ltd., both of Tokyo (JP)

( * ) Notice: Subject to any disclaimer, the term of this patent is extended or adjusted under 35 U.S.C. 154(b) by 0 days.

(21) Appl. No.: 09/434,447

(22) Filed: Nov. 5, 1999

(30) Foreign Application Priority Data

Mar. 29, 1999 (JP) .................................................. 11-086509

(51) Int. Cl.⁷ .................................................... H02K 23/00
(52) U.S. Cl. ........................... 318/254; 318/439; 318/138; 318/650; 318/560; 318/432
(58) Field of Search .................................... 318/254, 439, 318/138, 650, 560, 432

(56) References Cited

U.S. PATENT DOCUMENTS

| | | | |
|---|---|---|---|
| 5,616,979 | * 4/1997 | Nishikawa | 318/376 |
| 5,616,996 | 4/1997 | Tang et al. | |
| 5,992,950 | * 11/1999 | Kumar et al. | 318/376 |

FOREIGN PATENT DOCUMENTS 6-121583    4/1997   (JP) .

* cited by examiner

*Primary Examiner*—Karen Masih
(74) *Attorney, Agent, or Firm*—Burns, Doane, Swecker & Mathis, LLP

(57) ABSTRACT

An object is to realize acoustic noise reduction under a wide range of rotating speeds and together with PWM control. A signal (VCTL1) is generated as a trapezoidal wave repeatedly rising and falling in each given electrical angle section extending before and after the current-supply pattern is switched in accordance with the electrical angle of a rotor of a motor, and a signal (VCTL2) is generated in the opposite phase. A control circuit (22) appropriately selects among the signals (VCTL1 and VCTL2) and a given signal (SCTL) and inputs them to comparators (59 to 61). The comparators (59 to 61) compare the input signals with a carrier signal (B6) provided as a triangular wave. Switch elements for controlling the current-supply pattern to the motor turn on/off on the basis of output signals (C1 to C6) from the comparators (59 to 61). As a result, the current-supply pattern is switched softly by PWM control in the electrical angle section mentioned above.

13 Claims, 22 Drawing Sheets

F I G . 1 5
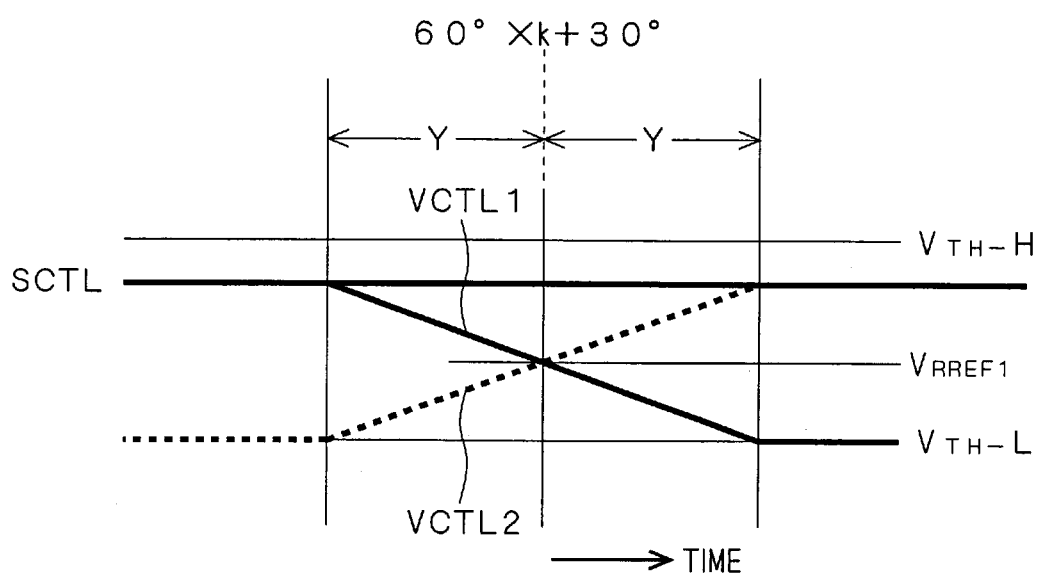

MOTOR DRIVING APPARATUS

BACKGROUND OF THE INVENTION

1. Field of the Invention

The present invention relates to a motor driving apparatus which is suited to driving of a polyphase motor.

2. Description of the Background Art

FIG. 22 is a block diagram showing the structure of a conventional motor driving apparatus as a background of the present invention. This apparatus 90 is used to drive a motor 201 which is a sensor-less (having no Hall element for detecting the rotating position) and brush-less three-phase motor. This apparatus 90 includes an output circuit 101, a selecting circuit 102, an induced voltage detecting circuit 108, a commutation control circuit 120, a starting circuit 121, terminals SU, SV, SW, and a terminal scom. To drive the motor 201 by using the apparatus 90, the terminals SU, SV, SW are connected to the three coil terminals of the motor 201 and the terminal scom is connected to the neutral terminal of the motor 201.

The output circuit 101 has a plurality of switch elements (not shown) interposed between the terminals SU, SV, SW and a power-supply line (not shown) and a ground line. These plurality of switch elements are selectively turned on (conduct) and off (disconnect) to realize a plurality of current-supply patterns. The induced voltage detecting circuit 108 is connected to the terminals SU, SV, SW and the terminal scom to detect points at which the induced voltages at the terminals SU, SV, SW cross the neutral voltage of the motor 201 inputted through the terminal scom.

The commutation control circuit 120 generates and outputs a control signal A1 for controlling on/off operation of the plurality of switch elements in the output circuit 101 on the basis of a detection signal B2 outputted from the induced voltage detecting circuit 108 when the motor 201 is operating or when the rotor is rotating. The control signal A1 is sequentially switched in accordance with the electrical angle of the rotor between a plurality of values corresponding to the plurality of current-supply patterns. When the motor 201 is operating, the selecting circuit 102 sends the control signal A1 to the plurality of switch elements in the output circuit 101 as control signals C1 to C6. The motor 201 is thus supplied with current in the plurality of current-supply patterns in accordance with the electrical angle of the rotor.

The starting circuit 121 outputs a control signal A2 when starting the motor 201, that is, when the rotor at rest starts rotating. When the motor 201 starts rotating, the selecting circuit 102 selects the control signal A2 and sends it to the output circuit 101 as the control signals C1 to C6. Thus torque for starting is given to the rotor and the rotor starts rotating. When the operation of starting the motor 201 is finished, the selecting circuit 102 selects the control signal A1 and sends it to the output circuit 101, as stated above.

FIG. 23 is a timing chart showing signals in individual parts of the apparatus 90. In the apparatus 90, when starting the motor 201, the starting circuit 121 sequentially forces the current-supply pattern to change independently of the position of the rotor (rotating position) in a given period from the beginning of starting (to the point P in FIG. 23) to give starting torque to the rotor. As shown in FIG. 23, the control signals C1 to C6 (equivalent to the control signal A2) in the starting period from the beginning of starting to the point P change in the same order as the control signals C1 to C6 (equivalent to the control signal A1) in the driving period after the point P, with their switching time intervals gradually becoming shorter.

That is to say, in the starting period, the current-supply patterns corresponding to the range from 0 to 360° in electrical angle of the rotor in the driving period are generated irrespective of the position of the rotor. In this way, in the conventional motor driving apparatus, the current-supply patterns for starting are developed in a predetermined order irrespective of the stop position at which the rotor of the motor 201 rested before started, so that the rotor may once reversely rotate and then normally rotate when started.

Further, as shown in FIG. 23, in the driving period in which the rotor rotates, spike voltage appears due to switch of the current-supply pattern (i.e. commutation switch) in the induced voltages SU, SV, SW (hereinafter the terminal voltages are simply represented by the same characters as the terminals) induced at the terminals SU, SW, SW (for example, the part surrounded by the dotted circle in FIG. 23). As has been already stated, the induced voltage detecting circuit 108 detects the points at which the induced voltages SU, SV, SW cross the neutral voltage scom (the parts surrounded by the solid circles in FIG. 23) and outputs the detection signal B2. Then the commutation control circuit 120 sequentially switches the control signal A1 between a plurality of kinds corresponding to the plurality of current-supply patterns on the basis of the detection signal B2. Accordingly the spike voltage may cause the control signal A1 to be switched by erroneous timing.

For the purpose of avoiding such erroneous detection in the induced voltage detecting circuit 108, a mask circuit is provided to prevent the induced voltage detecting circuit 108 from detecting crossing of the induced voltages SU, SV, SW and the neutral voltage scom in the vicinities of spike voltage (mask period). However, the mask period is set to a given length of time for a structural reason of the mask circuit, and therefore the following problems arise. When the rotor of the motor 201 rotates at low speed, the ratio of the mask period to one-turn period is so small that the erroneous detection cannot be prevented sufficiently. When it rotates at high speed, the ratio of the mask period becomes unnecessarily large to possibly prevent normal detection. That is to say, it has been difficult to prevent such erroneous detection at a wide range of rotating speeds.

Also, there is another known motor driving apparatus improved to switch the current-supply pattern not instantaneously but softly in a given time width to reduce acoustic noise caused by switch of the current-supply pattern. However, this improved apparatus realizes the slanted switching by utilizing charge/discharge of a capacitance element, so that the time width for switching remains constant independently of the rotating speed. Accordingly, when the rotor rotates at high speed, the ratio of the time width for switching to one-turn period becomes large, leading to the problem that sufficiently high power cannot be obtained.

Moreover, this improved apparatus has the problem that it cannot make PWM control of the output current. A conventionally known type of motor driving apparatus makes the switching elements in the output circuit 101 perform pulsing operation on the basis of the PWM control to control the effective output current, thereby enabling versatile control of power of the motor 201. However, the above-mentioned apparatus improved to reduce acoustic noise cannot be adapted for PWM control. In other words, a motor driving apparatus performing PWM control cannot reduce acoustic noise.

SUMMARY OF THE INVENTION

According to a first aspect of the present invention, a motor driving apparatus for driving a motor by sequentially switching among a plurality of current-supply patterns in accordance with electrical angle of a rotor comprises: an output circuit having a plurality of switch elements individually interposed between a plurality of terminals of the motor, and first and second power-supply lines; a detection control circuit for controlling the plurality of switch elements to sequentially switch among the plurality of current-supply patterns while the rotor is resting; a current detecting circuit for detecting current flowing through the plurality of terminals; a position detecting circuit for detecting stop position of the rotor on the basis of rate of change in the current for each of the plurality of current-supply patterns; and a starting control circuit for selecting one of the plurality of current-supply patterns as a current-supply pattern for starting on the basis of the stop position and controlling the plurality of switch elements to realize the selected current-supply pattern.

Preferably, according to a second aspect of the present invention, in the motor driving apparatus, the position detecting circuit comprises; a counter which start counting a clock signal as each one of the plurality of current-supply patterns starts and stops the counting every time the current reaches a reference value, a register for holding a plurality of count values which the counter indicates after stopping respectively in correspondence with the plurality of current-supply patterns, and a position determining circuit for determining the stop position of the rotor on the basis of the plurality of held count values.

Preferably, according to a third aspect of the present invention, in the motor driving apparatus, the position determining circuit determines the stop position of the rotor on the basis of which of the plurality of current-supply patterns corresponds to a maximum or minimum value among the plurality of held count values.

According to a fourth aspect of the present invention, a motor driving apparatus for driving a motor by sequentially switching among a plurality of current-supply patterns in accordance with electrical angle of a rotor comprises: an output circuit having a plurality of switch elements individually interposed between a plurality of terminals of the motor, and first and second power-supply lines; an induced voltage detecting circuit for outputting a detection signal for informing that any one of a plurality of included voltages induced respectively at the plurality of terminals crosses neutral voltage of the motor; and a commutation control circuit for controlling the plurality of switch elements to sequentially switch among the plurality of current-supply patterns on the basis of the detection signal and detecting whether the electrical angle is located in a given electrical angle section including an electrical angle at which the plurality of current-supply patterns are switched; wherein the induced voltage detecting circuit ceases output of the detection signal in the electrical angle section.

Preferably, according to a fifth aspect of the present invention, in the motor driving apparatus, the commutation control circuit comprises; a counter for counting a clock signal and which resets its count value on the basis of the detection signal every time any of the plurality of induced voltages crosses the neutral voltage, a register which updates its held signal every time the count value is reset with the count value immediately before reset, an electrical angle detecting circuit for comparing the count value and a first ratio (<1) times the held signal and outputting a signal when the two agree, a commutation selecting circuit for selecting a current-supply pattern to be realized after switching among the plurality of switch elements so as to switch to the selected current-supply pattern in synchronization with the signal outputted from the electrical angle detecting circuit, and a mask signal generating circuit for outputting a mask signal in a period in which the count value is between a second ratio ($\leq$the first ratio) times the held signal and a third ratio (>the first ratio) times the held signal, wherein the induced voltage detecting circuit ceases output of the detection signal in a period in which the mask signal is outputted.

Preferably, according to a sixth aspect of the present invention, in the motor driving apparatus, the induced voltage detecting circuit comprises; a plurality of comparators for comparing the plurality of induced voltages individually with the neutral voltage and outputting results of comparison, a plurality of edge detectors for individually detecting changes in outputs from the plurality of comparators and outputting results of detection as the detection signal, and a logic gate interposed between the plurality of edge detectors and the commutation control circuit, for passing the detection signal outputted from the edge detectors only when the mask signal is not outputted.

According to a seventh aspect of the present invention, a motor driving apparatus for driving a motor by sequentially switching among a plurality of current-supply patterns in accordance with electrical angle of a rotor comprises: an output circuit having a plurality of switch elements individually interposed between a plurality of terminals of the motor, and first and second power-supply lines; and a commutation control circuit for controlling the plurality of switch elements to sequentially switch among the plurality of current-supply patterns, wherein the commutation control circuit comprises an electrical angle section detecting circuit for detecting a given electrical angle section extending before and after switching of the plurality of current-supply patterns, and a switch control circuit for generating and outputting a signal in a form of pulses repetitively changing between a first value corresponding to a current-supply pattern before the switching and a second value corresponding to a current-supply pattern after the switching with their duties so changed that time ratio of the first value decreases and time ratio of the second value increases, in the electric angle section, as a signal for controlling a switch element whose operation changes between before and after the switching among the plurality of switch elements.

Preferably, according to an eighth aspect of the present invention, the motor driving apparatus further comprises an induced voltage detecting circuit for outputting a detection signal for informing that any one of a plurality of induced voltages induced respectively at the plurality of terminals crosses neutral voltage of the motor, and the commutation control circuit further comprises; a counter for counting a clock signal and which resets its count value on the basis of the detection signal every time any of the plurality of induced voltages crosses the neutral voltage, a register which updates its held signal every time the count value is reset with the count value immediately before reset, and a commutation selecting circuit for sequentially switching and outputting a plurality of control signals for respectively controlling the plurality of switch elements, corresponding to the plurality of current-supply patterns, wherein the electrical angle section detecting circuit comprises; a first calculating unit for calculating a first ratio (<1) times the held signal, a second calculating unit for calculating a second ratio (the first ratio<the second ratio<1) times the held signal, a first comparator for comparing the count value and the first ratio times the held signal, a second comparator for comparing the count value and the second ratio times the held signal, and an informing signal output circuit for outputting an informing signal for informing that the electrical angle is in the electrical angle section in period from when the count value reaches the first ratio times the held signal to when the count value reaches the second ratio times the held signal on a basis of results of comparison made by the first and second comparators.

The commutation selecting circuit selects a current-supply pattern to be realized after switching from among the plurality of current-supply patterns on the basis of the detection signal and updates the plurality of control signals to be outputted from the plurality of control signals corresponding to the current-supply pattern before switching to the plurality of control signals corresponding to the current-supply pattern after switching in synchronization with the beginning of output of the informing signal, and the switch control circuit operates regarding a period in which the informing signal is outputted as the electric angle section, a value of a control signal for the switch element whose operation changes between before and after the switching among the plurality of control signals corresponding to a current-supply pattern before the switching as the first value, and a value of a control signal for the switch element whose operation changes between before and after the switching among the plurality of control signals corresponding to a current-supply pattern after the switching as the second value.

Preferably, according to a ninth aspect of the present invention, in the motor driving apparatus, the switch control circuit comprises; a reference signal generating circuit for generating a rising signal and a falling signal which rise and falls in the period in which the informing signal is outputted, and a PWM circuit, which includes a carrier generating circuit for generating a carrier signal as a periodically repeating triangular wave, for comparing a reference signal selected from the rising signal and the falling signal with the carrier signal in the period in which the informing signal is outputted, and changing the signal in a form of pulses so as to have the first value when one of the two compared is larger and the second value when the other is larger.

Preferably, according to a tenth aspect of the present invention, in the motor driving apparatus, the reference signal generating circuit comprises; a variable resistor whose resistance value is proportional to the held signal, a circuit for applying a given voltage to the variable resistor, a capacitance element, a circuit for repeatedly charging and discharging the capacitance element with a current whose magnitude is proportional to current flowing in the variable resistor, and a circuit for sending one and the other of signals respectively proportional to a voltage signal held in the capacitance element and its inversion signal to the PWM circuit as the rising signal and the falling signal.

Preferably, accordingly to an eleventh aspect of the present invention, in the motor driving apparatus, the commutation control circuit further comprises another electrical angle section detecting circuit for detecting whether the electrical angle is located in another given electrical angle section including the beginning of the electrical angle section, and the induced voltage detecting circuit ceases output of the detection signal in that another electrical angle section.

Preferably, according to a twelfth aspect of the present invention, in the motor driving apparatus, the commutation control circuit further comprises a control signal selecting circuit interposed between the switch control circuit and the plurality of switch elements, for selectively sending signals outputted from the switch control circuit and the plurality of control signals outputted from the commutation selecting circuit to the plurality of switch elements.

Preferably, according to a thirteenth aspect of the present invention, in the motor driving apparatus, the commutation control circuit further comprises; an electrical angle detecting circuit for comparing the count value of the counter and a third ratio (the first ratio<the third ratio<the second ratio) times the held signal and outputting an electrical angle detection signal when the two agree, and a signal selecting circuit for selectively sending the informing signal and the electrical angle detection signal to the commutation selecting circuit, and the commutation selecting circuit updates the plurality of control signals in synchronization selectively with beginning of output of the informing signal or the electrical angle detection signal sent from the signal selecting circuit.

According to the apparatus of the first aspect of the present invention, the stop position of the rotor is detected on the basis of the rate of increase in current supplied to the motor and the current-supply pattern to be used in starting operation is determined on the basis of the result. This prevents reverse rotation in the starting operation and enables the rotor to be started with appropriate torque.

According to the apparatus of the second aspect, the rate of increase in the current can be easily measured through count values counted by the counter before the current reaches a reference value. That is to say, the rate of increase in the current can be measured with a simple circuit.

According to the apparatus of the third aspect, the stop position of the rotor is determined by determining the current-supply pattern corresponding to the maximum or minimum value among the count values, so that the position determining circuit can be constructed simply.

According to the apparatus of the fourth aspect, the induced voltage detecting circuit stops output of the detection signal in the given electrical angle section, which prevents erroneous detection due to voltage spike superimposed on the induced voltages at a wide range of rotating speeds.

According to the apparatus of the fifth aspect, the circuit for generating the mask signal for defining the period in which the induced voltage detecting circuit stops output of the detection signal can be simply constructed by utilizing the circuit for generating the plurality of current-supply patterns. Particularly, the given electrical angle section in which the mask signal is outputted can be easily determined by utilizing the held signal in the register multiplied by given ratios.

According to the apparatus of the sixth aspect, a logic gate controlled by the mask signal is interposed between the edge detectors and the commutation control circuit, so that the pause of the detection signal based on the mask signal can be realized with a simple circuit.

According to the apparatus of the seventh aspect, soft switching is realized in the period extending across switching of the current-supply pattern, so as to reduce the acoustic noise. Further, since the soft switching is performed in the given electrical angle section, the reduction of acoustic noise can be adapted to a wide range of rotating speeds. Moreover, since the soft switching is realized with PWM control of outputting the control signal in the form of repetitive pulses with changing duties, it is possible to perform PWM control similarly to a conventional PWM control type motor driving apparatus also in periods other than the soft switching periods. That is to say, the reduction of acoustic noise and versatile control of the power to the motor can be realized compatibly.

According to the apparatus of the eighth aspect, the circuit for generating the informing signal defining the period in which soft switching is to be realized can be simply constructed by utilizing the circuit for generating the plurality of current-supply patterns. Particularly, the given electrical angle section for outputting the informing signal can be easily determined by utilizing the held signal in the register multiplied by given ratios.

According to the apparatus of the ninth aspect, the soft switching based on PWM control can be easily realized with a simple circuit structure using the rising signal, falling signal, and the carrier signal.

According to the apparatus of the tenth aspect, the rising signal and falling signal that vary at a rate proportional to the rotation frequency of the rotor can be generated with a simple circuit structure.

According to the apparatus of the eleventh aspect, the induced voltage detecting circuit stops output of the detection signal in the given electrical angle section including the beginning of the electrical angle section in which soft switching is performed, so that the erroneous detection due to voltage spike superimposed on the induced voltages at the beginning of soft switching can be prevented. Furthermore, since the output of the detection signal is stopped in the given electrical angle section, the erroneous detection prevention can be adapted to a wide range of rotating speeds.

According to the apparatus of the twelfth aspect, the control signal selecting circuit enables control based on the PWM control and another control to be freely selected to control the plurality of switch elements. Accordingly, by alternately selecting the two kinds of control signals in a period in which soft switching is performed and in the other period, the plurality of switch elements can be kept in on/off state unchanged without PWM control in the period in which soft switching is not performed.

According to the apparatus of the thirteenth aspect, when the signal selecting circuit selects the electrical angle detection signal and the control selecting circuit always selects the control signal outputted from the commutation selecting circuit, the maximum power can be given to the motor without soft switching. That is to say, quiet operation with reduced acoustic noise and operation with the maximum power to the motor can selectively be realized as needed.

The present invention has been made to solve the previously-described problems in a conventional apparatus caused when the motor to be driven is sensor-less, and an object of the present invention is to obtain a motor driving apparatus which is capable of preventing reverse rotation at the beginning of rotation, preventing erroneous detection of induced voltage at a wide range of rotating speeds, and realizing acoustic noise reduction adapted to a wide range of rotating speeds and PWM control.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a waveform diagram showing operation of the circuit of FIG. 13.

DESCRIPTION OF THE PREFERRED EMBODIMENTS

First Preferred Embodiment

Figure 1:
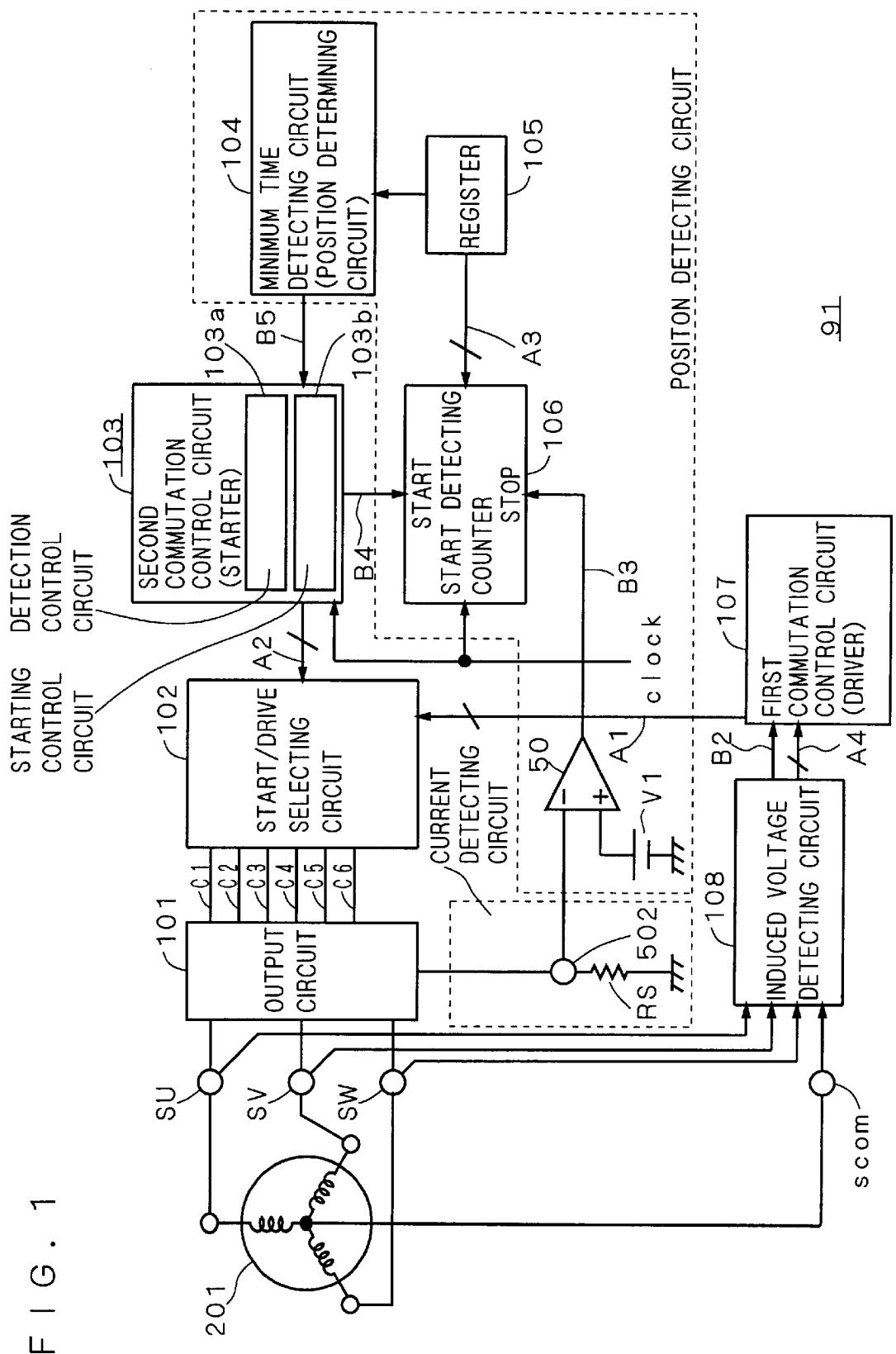
FIG. 1 is a block diagram showing an apparatus according to a first preferred embodiment of the present invention.
Figure 22:
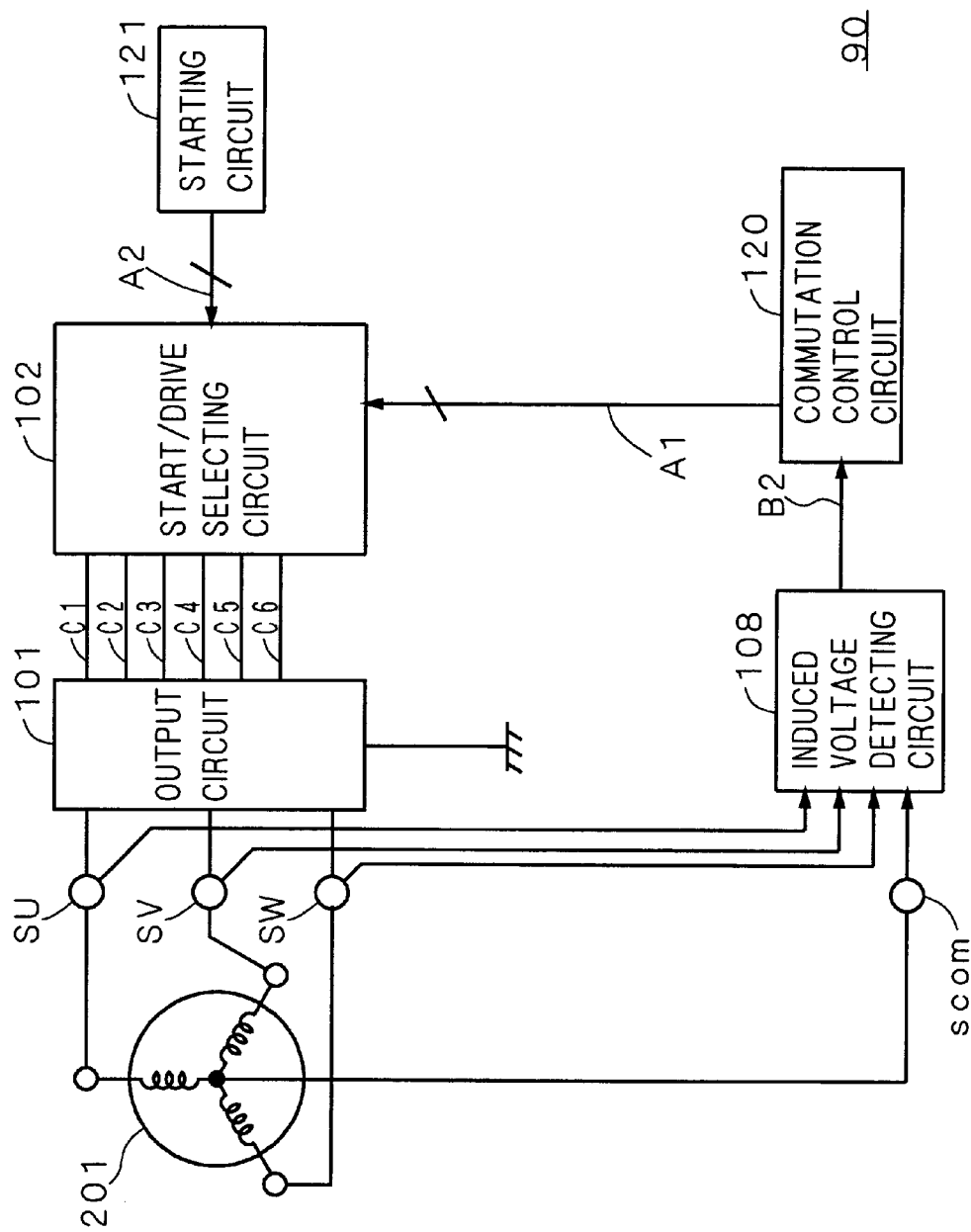
FIG. 22 is a block diagram showing a conventional apparatus.
Figure 23:
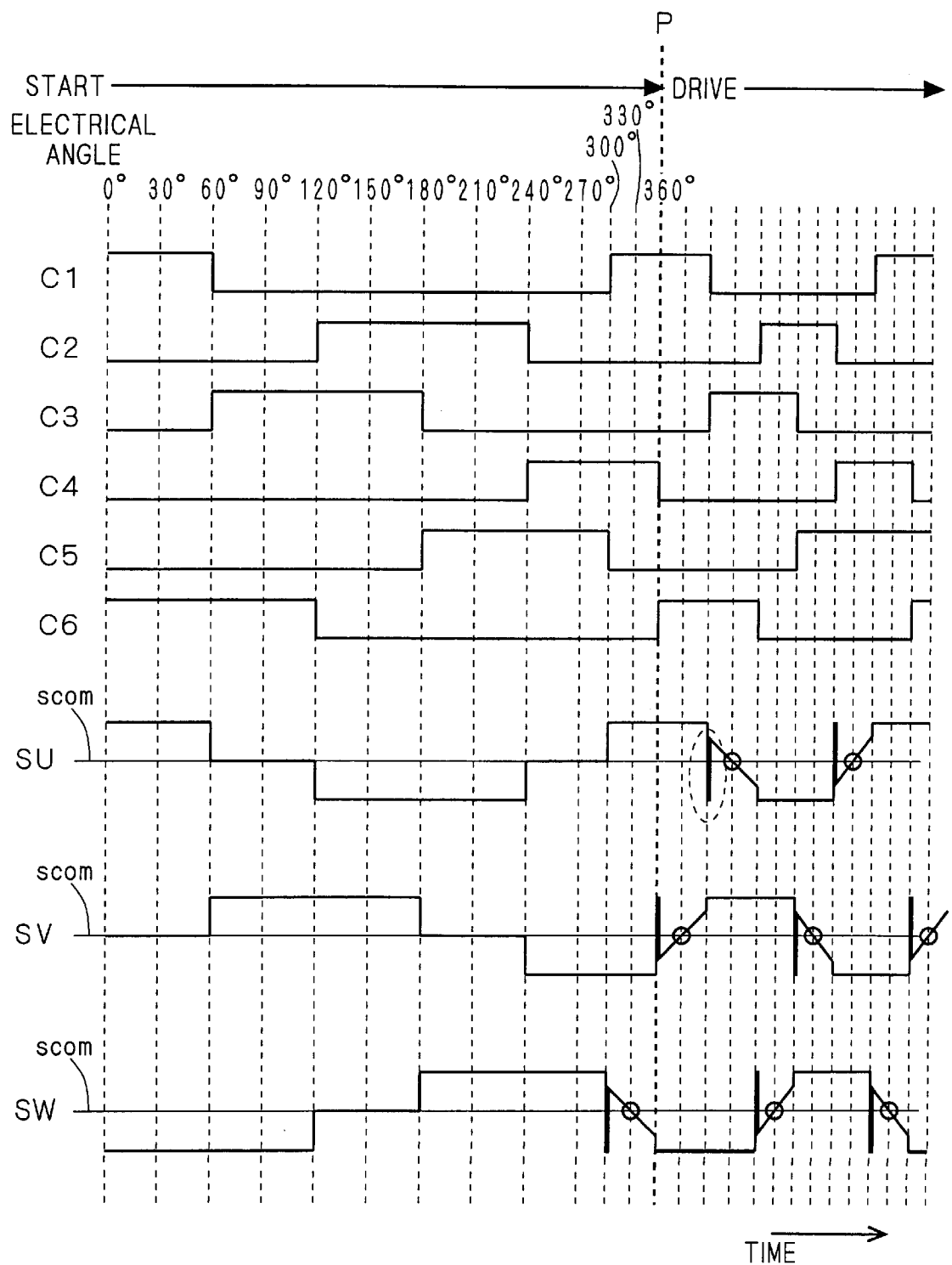
FIG. 23 is a timing chart showing operation of the conventional apparatus of FIG. 22.

FIG. 1 is a block diagram showing the structure of a motor driving apparatus according to a first preferred embodiment of the present invention. Similarly to the conventional apparatus 90 (FIG. 22), this apparatus 91 is used to drive the motor 201 which is a sensor-less and brush-less three-phase motor. The apparatus 91 includes an output circuit 101, a selecting circuit 102, an induced voltage detecting circuit 108, a (first) commutation control circuit 107, a (second) commutation control circuit 103, a minimum time detecting circuit 104, a register 105, a counter 106, a comparator 50, a resistor RS, terminals SU, SV, SW, a terminal scom, and a clock generating circuit not shown.

The current detecting circuit of the present invention includes the resistor RS, and the position detecting circuit of the invention includes the comparator 50, minimum time detecting circuit 104, register 105, and counter 106. To drive the motor 201 by using the apparatus 91, as shown in FIG. 1, the terminals SU, SV, SW are connected to the three coil terminals of the motor 201 and the terminal scom is connected to the neutral terminal of the motor 201.

Figure 2:
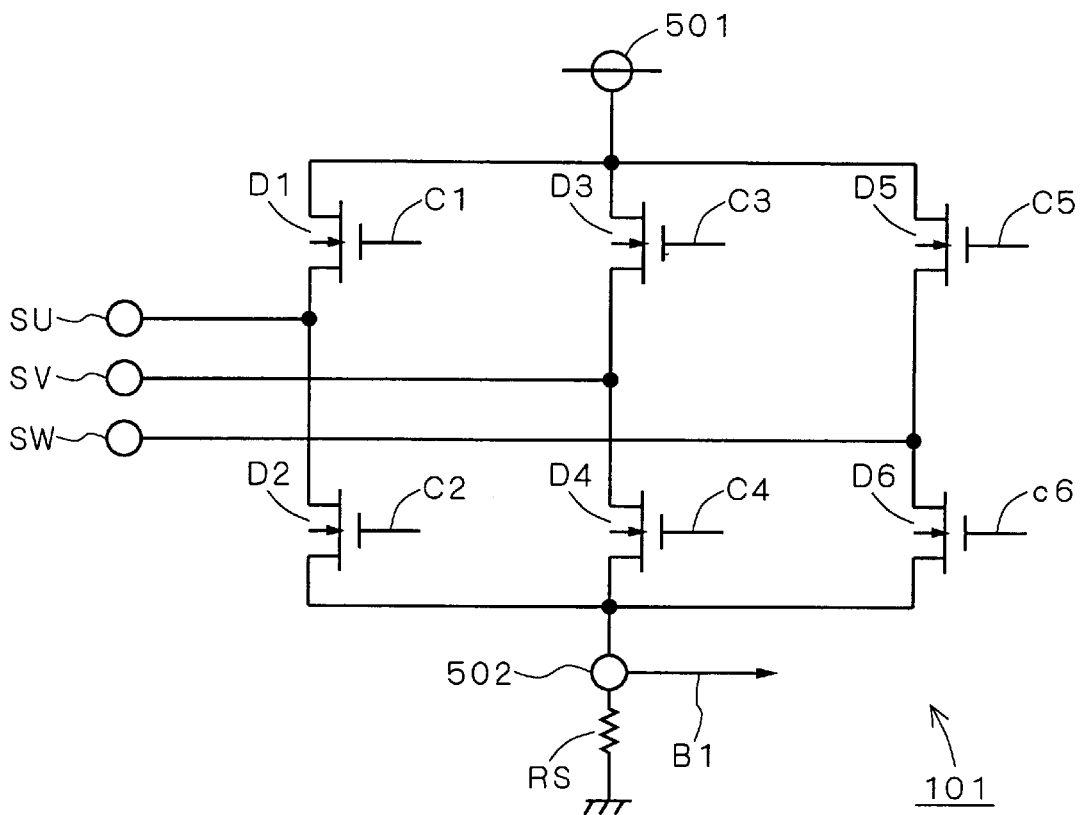
FIG. 2 is a block diagram showing the output circuit of FIG. 1.

FIG. 2 is a circuit diagram shown the internal structure of the output circuit 101. As shown in FIG. 2, the output circuit 101 has a plurality of switch elements D1 to D6 interposed between the terminals SU, SV, SW and a power-supply line (a first power-supply line) 501 and a ground line (a second power-supply line). These plurality of switch elements selectively turn on (conduct) and of (disconnect) in response to control signals C1 to C6 to realize a plurality of current-supply patterns.

The resistor RS is interposed between the switch elements D1 to D6 and the ground line; i.e., the switch elements D1 to D6 are indirectly connected to the ground line through the resistor RS. A terminal 502 is provided at the connection between the switch elements D1 go D6 and the resistor RS, and a signal B1 as a voltage signal is taken out from the terminal 502. The resistor RS is an element provided to detect the current supplied to the motor 201 through the signal B1, whose resistance value is set low enough not to substantially affect control of the output current by the switch elements D1 to D6. Accordingly the switch elements D1 to D6 can substantially be regarded as being connected directly to the power-supply line 501 and the ground line.

Figure 3:
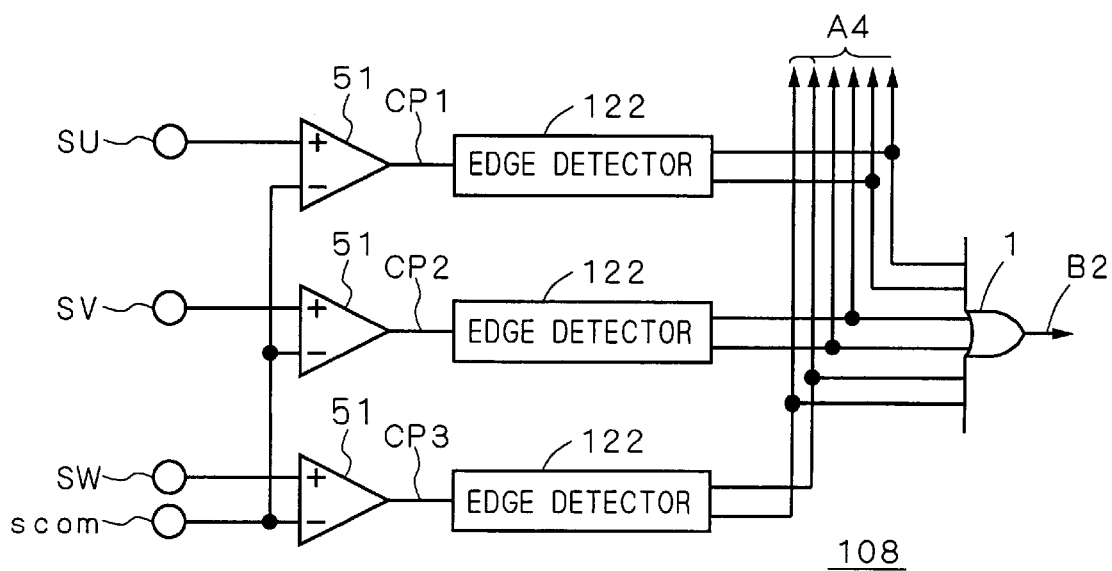
FIG. 3 is a block diagram showing the induced voltage detecting circuit of FIG. 1.

FIG. 3 is a block diagram showing the internal structure of the induced voltage detecting circuit 108. As shown in FIG. 3, the induced voltage detecting circuit 108 has three comparators 51, three edge detectors 122, and an OR circuit 1. The three comparators 51 respectively compare the induced voltages at the terminal SU, SV, SW with the neutral voltage sent to the terminal scom and outputs the results as signals CP1 to CP3. The three edge detectors 122 detect leading edges and trailing edges of the signals CP1 to CP3 outputted from the three comparators 51 and output the results as a detection signal A4. The OR circuit 1 outputs OR of the detection signal A4 as a detection signal B2.

Thus the induced voltage detecting circuit 108 provides a signal indicating which of the induced voltages at the terminals SU, SV, SW crossed the neutral voltage in which direction (i.e., during rise or fall) as the detection signal A4. At the same time, when any of the induced voltages at the terminals SU, SV, SW crossed the neutral voltage in any direction, a signal indicating the occurrence of crossing is obtained as the detection signal B2. Accordingly, the detection signal B2 is outputted every time the electrical angle of the rotor reaches 60°×k (k=integer). The detection signal A4 and the detection signal B2 are referred to by the commutation control circuit 107.

Figure 4:
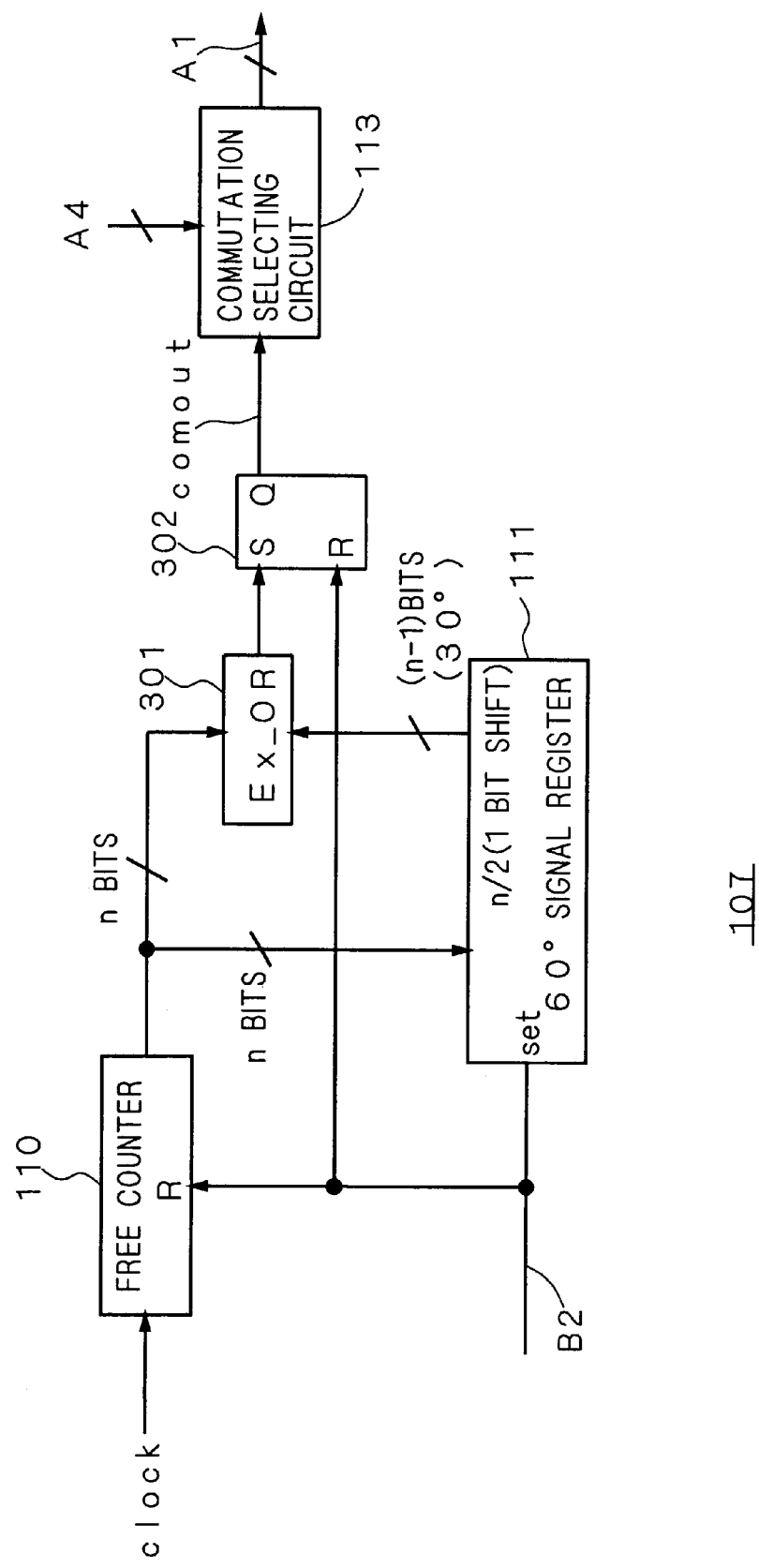
FIG. 4 is a block diagram showing the commutation control circuit of FIG. 1.

FIG. 4 is a block diagram showing the internal structure of the commutation control circuit 107. The commutation control circuit 107 generates and outputs a control signal A1 for controlling on/of action of the switch elements D1 to D6 in the output circuit 101 in the driving operation or when the rotor is rotating, so as to sequentially realize a plurality of current-supply patterns in accordance with the electrical angle of the rotor. The selecting circuit 102 (FIG. 1) selects the control signal A1 when driving and sends it to the output circuit 101 as the control signals C1 to C6.

The commutation control circuit 107 includes a counter 110, a register 111, a comparator 301, an SR latch 302 and a commutation selecting circuit 113. While the counter 110 counts a clock signal clock generated by the clock generating circuit, it resets the count value to zero every time the detection signal B2 is inputted. The register 111 updates its held signal with the count value indicated by the counter 110 just before the count value is reset, every time the detection signal B2 is inputted. Thus the register 111 always stores the newest time corresponding to the electrical angle section of 60°, or the newest ⅙ period, as a value expressed in pluses of the clock signal clock. The held signal is represented by an n-bit binary number.

The comparator 301 compares a signal of n−1 bits obtained by the register 111 by shifting the n-bit held signal by one bit to the right, or a value corresponding to ½ times the value of the held signal, with the count value of the counter 110, and it outputs a given signal (e.g. a high-level signal) when the two value agree. The comparator 301 can be constructed with an exclusive OR circuit, for example. Thus the signal is outputted from the comparator 301 at the time when the electrical angle further advances by 30° after input of the detection signal B2, that is, at the time when the electrical angle reaches 60°×k+30°.

The SR latch 302 receives the output signal from the comparator 301 at its set input S and the detection signal B2 at its reset input R. Accordingly the signal comout outputted from the non-inverted output Q of the SR latch 302 is active when the electrical angle is in the range of 60°×k+30° to 60°×k+60°.

On the basis of the detection signal A4, the commutation selecting circuit 113 generates a control signal corresponding to a new current-supply pattern to be realized next after the present current-supply pattern, or a current-supply pattern to be given after the switch operation. It switches the control signal A1 from a value corresponding to the present current-supply pattern to a value corresponding to the current-supply pattern after switch at the time when the signal comout becomes active. Accordingly the control signal A1 is switched to a value corresponding to a new current-supply pattern every time the electrical angle reaches 60°×k+30°.

Figure 5:
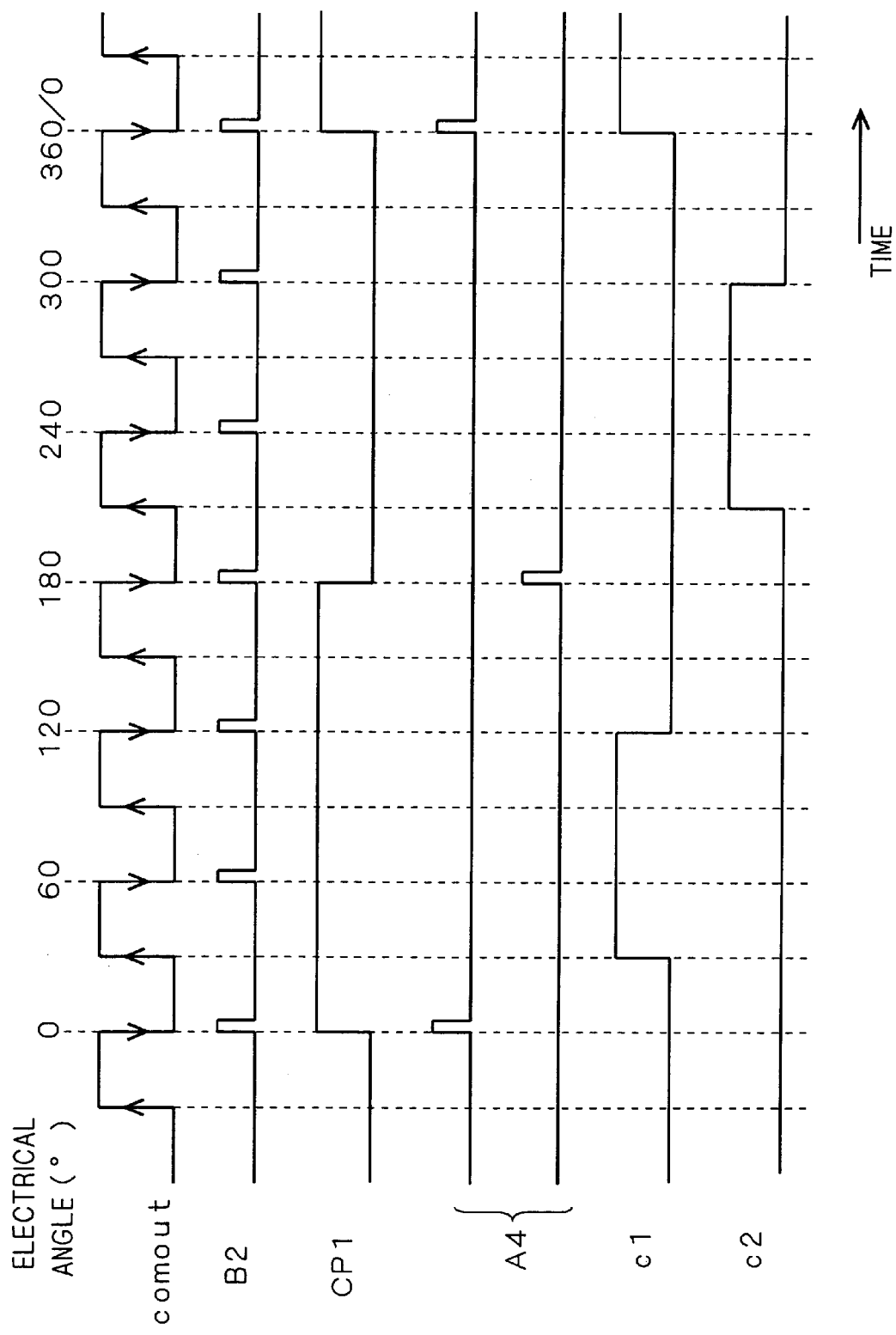
FIG. 5 is a timing chart showing operation of the apparatus of FIG. 1.

FIG. 5 is a timing chart showing the signal sin individual parts of the apparatus 91 in the driving operation. As shown in FIG. 5, the detection signal B2 is outputted in pulse form every time the electrical angle reaches 60°×k. The signal comout rises in synchronization with it. The signal CP1 changes every time the electrical angle reaches 180°×k. One signal in the detection signal A4 outputs a pulse in synchronization with the rise of the signal CP1 and another signal outputs a pulse in synchronization with fall of the signal CP1.

Then, at the time when the electrical angle of 30° has been elapsed from the rise of the signal CP1, the control signal C1 changes to the value corresponding to the new current-supply pattern. Also, at the time when the electrical angle of 30° has elapsed from the fall of the signal CP1, the control signal C2 changes to the value corresponding to the new current-supply pattern The current-supply pattern is controlled in this way in the driving operation.

Referring to FIG. 1 again, the commutation control circuit 103 generates and outputs a control signal A2 for controlling on/off action of the switch elements D1 to D6 in the output circuit 101 in starting operation, or when the rotor starts. The selecting circuit 102 selects the control signal A2 when starting and sends it to the output circuit 101 as the control signal C1 to C6. The commutation control circuit 103 includes a detection control circuit 103a and a starting control circuit 103b.

Figure 6:
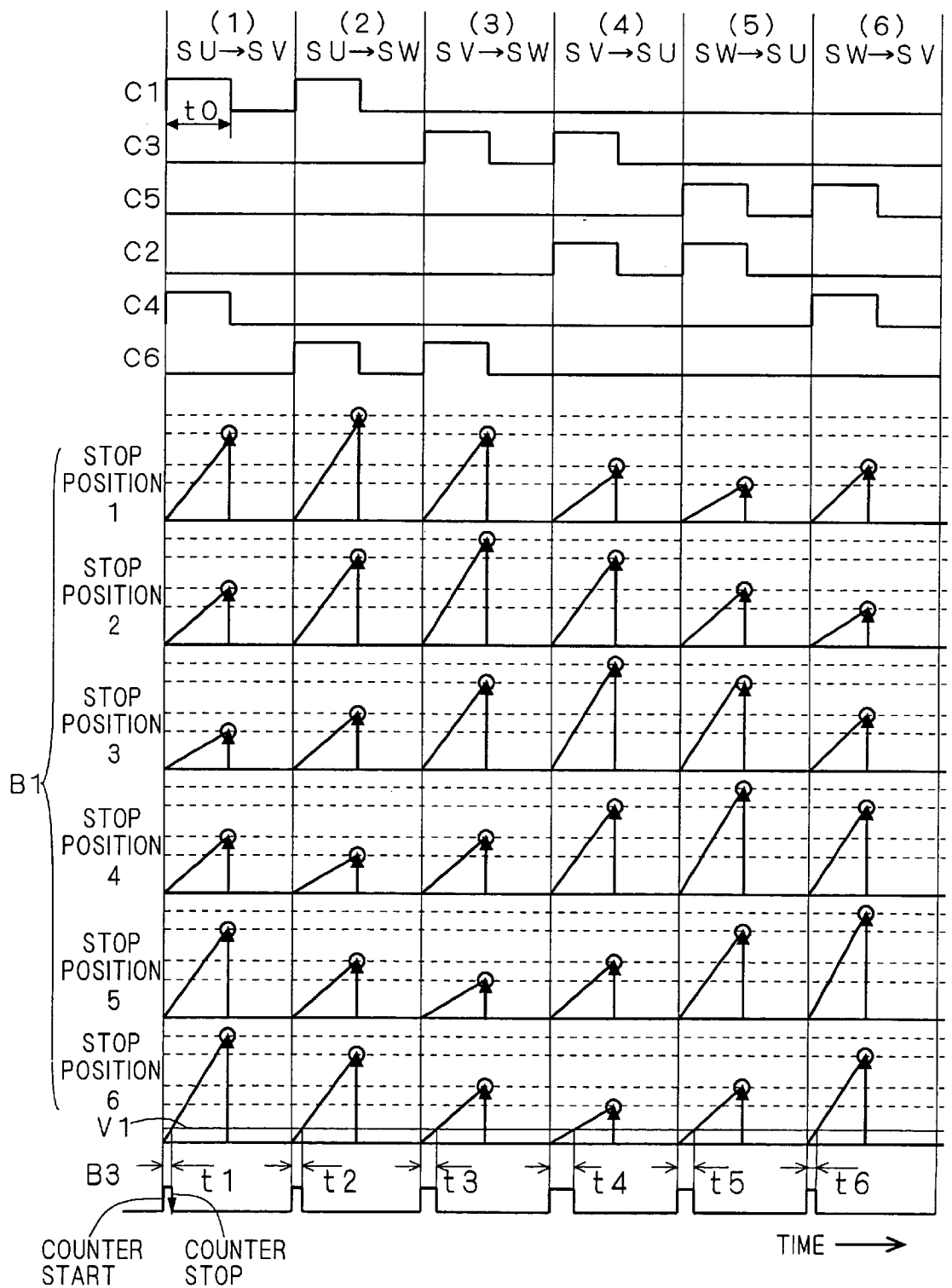
FIG. 6 is another timing chart showing operating of the apparatus of FIG. 1.

The detection control circuit 103a generates a control signal corresponding to the plurality of current-supply patterns to detect the stop position of the rotor and outputs it as the control signal A2. FIG. 6 is a timing chart showing an example of the control signal A2 outputted from the detection control circuit 103a and the voltage signal B1 appearing at the terminal 502 in response to it. The control signals C1 to C6 in FIG. 6 correspond to the control signal A2.

In the example of FIG. 6, the control signal A2 is generated to sequentially realize six current-supply patterns:

a first current-supply pattern in which the output current flows from the terminal SU to the terminal SV, a second current-supply pattern in which it flows from the terminal SU to the terminal SW, . . . and a sixth current-supply pattern in which it flows from the terminal SW to the terminal SV. While these six current-supply patterns correspond to the six current-supply patterns switched every time the electrical angle reaches 60°×k+30° in the driving operation, their order can be at random.

The current-supply time t0, that is, the period in which the output current is supplied to the motor 201 in a certain current-supply pattern, is limited to such a short time that the rotor does not rotate. The inductance of the motor 201 measured through the terminals SU, SV, SW differs depending on the stop position of the rotor. Reflecting this, the rate of increase in the output current flowing to the motor 201 when the output current is supplied in a certain current-supply pattern differs depending on the stop position of the rotor. Further, even with the same stop position, the rat of increase of the output current differs in different current-supply patterns. The position detecting circuit (FIG. 1) utilizes this fact to detect the stop position of the rotor on the basis of the rate of change in the output current for each of the plurality of current-supply patterns.

The output current is detected by the resistor RS (FIG. 1). That is to say, a voltage proportional to the output current is obtained as the signal B1. FIG. 6 shows an example of variations of the signal B1 corresponding to the six kinds of stop positions of the rotor. For example when the rotor is at the stop position 1, the rate of increase in the signal B1 is the largest in the second current-supply pattern and the smallest in the fifth current-supply pattern. When the rotor is at the stop position 6, the rate of increase in the signal B1 is the largest in the first current-supply pattern and the smallest in the fourth current-supply pattern.

The comparator 50 compares the signal B1 with a reference voltage V1 and outputs the result of comparison as a signal B3. In FIG. 6, a high level is outputted as the signal B3 while the signal B1 is under the reference voltage V1. The time required for the signal B1 to reach the reference voltage V1, that is, the time in which the signal B3 stays at the high level, is in inverse proportion to the rate of increase in the output current. Accordingly, when the rotor is at the stop position 6, the time t1 is the smallest and the time t4 is the largest among the times t1 to t6.

Referring to FIG. 1 again, the counter 106 starts counting the clock signal clock from zero every time the detection control circuit 103a starts output of a new version of the control signal A2 and stops counting every time the signal B3 changes from the high level to the low level. Every time the counting operation stops, the stopped count value is stored in the register 105. Accordingly, after the output current has been supplied in the six kinds of current-supply patterns, the register 105 contains times t1 to t6 measured in terms of pulses of the clocks signal clock.

The minimum time detecting circuit 104 corresponding to the position determining circuit of the invention compares the times t1 to t6 held in the register 105 to determine which is the shortest, and determines the stop position of the rotor on the basis of the time determined as the shortest. For example, when the time t1 is the shortest, it determines that the rotor is at the stop position 6. The minimum time detecting circuit 104 sends a signal B5 representing the determination to the starting control circuit 103b.

The starting control circuit 103b selects a current-supply pattern which will not cause the rotor to reversely rotate among the six kinds of current-supply patterns as the current-supply pattern for starting on the basis of the signal B5, and it outputs the control signal A2 corresponding to the selected current-supply pattern. Accordingly, despite of the fact that the motor 201 is of sensor-less type, reverse rotation can be prevented in the starting operation and the rotor can be started with appropriate torque.

When the rotor starts rotating, the detection signal B2 appears before the electrical angle just advances by 60°. For example, the selecting circuit 102 switches the signal to be transferred as the control signals C1 to C6 from the control signal A2 to the control signal A1 when the first detection signal B2 appears. Subsequently, it is followed by normal operation or the operation for driving. When the detection signal B2 appears once, the electrical angle of the rotor is reflected in the detection signal A4. Accordingly, after the detection signal B2 appeared once, the commutation control circuit 107 can perform the driving.

The selecting circuit 102 may switch the signal from the control signal A2 to the control signal A1 after a given time has elapsed, instead of switching in synchronization with the detection signal B2. Alternatively, the control signal A2 may be switched to the control signal A1 after the starting control circuit 103b has sequentially realized the six kinds of current-supply patterns by realizing some current-supply patterns after the selected current-supply pattern as the first current-supply pattern, for example. The minimum time detecting circuit 104 may determine the maximum value in place of the minimum value among the times t1 to t6 to determine the stop position of the rotor.

<Second Preferred Embodiment>

Figure 7:
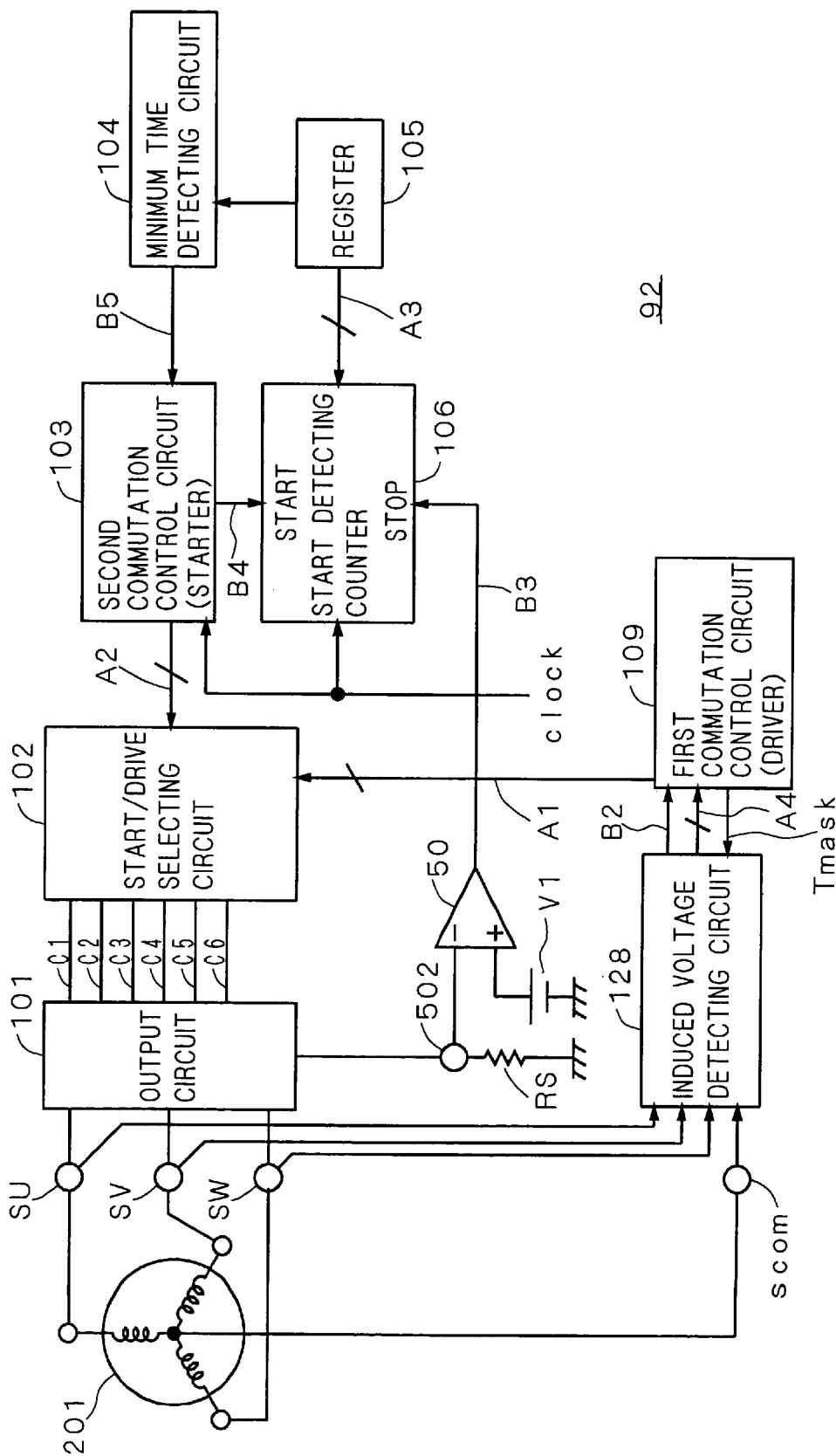
FIG. 7 is a block diagram showing an apparatus according to a second preferred embodiment.

FIG. 7 is a block diagram showing the structure of a motor driving apparatus according to a second preferred embodiment of the present invention. This apparatus 92 is characteristically different from the apparatus 91 of the first preferred embodiment in that it has an induced voltage detecting circuit 128 in place of the induced voltage detecting circuit 108 and a (first) commutation control circuit 109 in place of the commutation control circuit 107.

Figure 8:
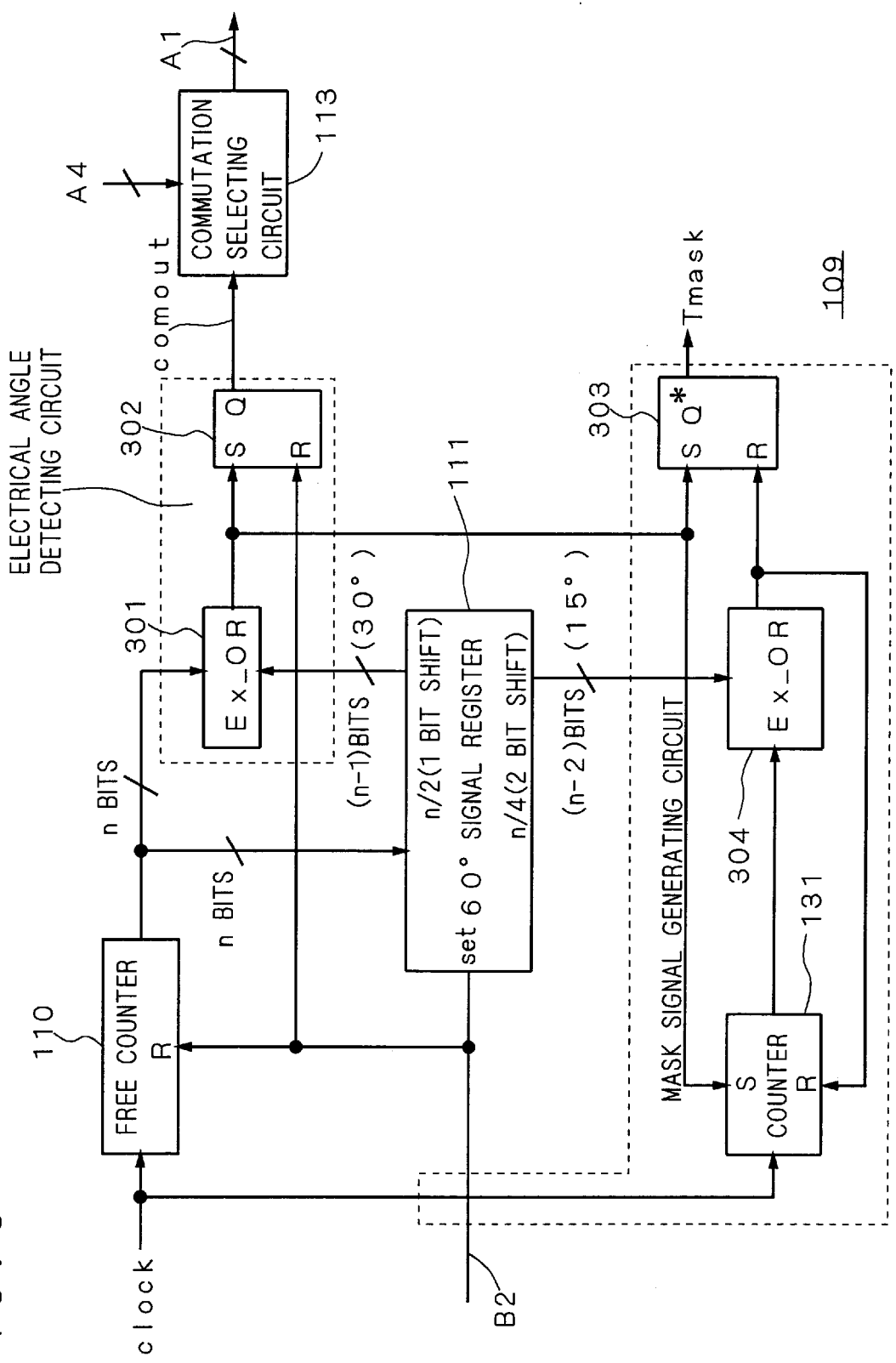
FIG. 8 is a block diagram showing the commutation control circuit of FIG. 7.

FIG. 8 is a block diagram showing the internal structure of the commutation control circuit 109. This commutation control circuit 109 is characteristically different from the commutation control circuit 107 in that it additionally includes a mask signal generating circuit of the present invention. The mask signal generating circuit includes a counter 131, a comparator 304, and an SR latch 303. The comparator 301 and the SR latch 302 are included in the electrical angle detecting circuit of the present invention.

The counter 131 starts counting the clock signal clock every time the comparator 301 detects that the count value of the counter 110 coincides with ½ times the value of the signal held in the register 111. The comparator 304 compares the count value of the counter 131 with a value obtained by shifting the held signal in the register 111 by two bits to the right, i.e. ¼ times the held signal value, and it outputs a given signal (a high-level signal, for example) when the two agree. The value ¼ times the held signal corresponds to the electrical angle section of 15°. The comparator 304 can be constructed with an exclusive OR circuit, for example. The counter 131 resets the count value to zero when the comparator 304 detects the coincidence of the values.

The SR latch 303 receives the output signal from the comparator 301 at its set input S and the output signal from the comparator 304 at its reset input R. When the count value of the counter 131 coincides with ¼ times the held signal in the register 111, the count value of the counter 110 coincides with ¾ times the held signal value. The function of the comparator 304 is therefore equivalent to comparison between the count value of the counter 110 and ¾ times the held signal value. Accordingly the mask signal Tmask outputted from the inverted output Q* of the SR latch 303 is active (low level) when the electrical angle is in the range from 60°×xk+30° to 60°×k+45°.

Figure 9:
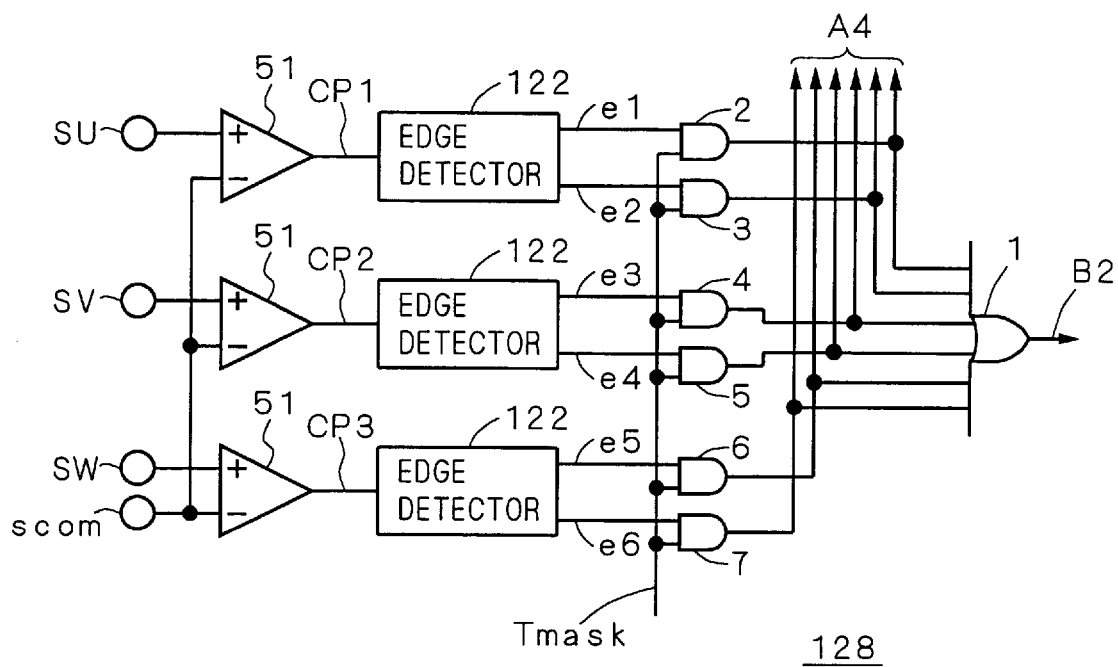
FIG. 9 is a block diagram showing the induced voltage detecting circuit of FIG. 7.

FIG. 9 is a block diagram showing the internal structure of the induced voltage detecting circuit 128. The induced voltage detecting circuit 128 is characteristically different from the induced voltage detecting circuit 108 (FIG. 3) in that it has the mask circuit of the invention between the three edge detectors 122 and the OR circuit 1. The mask circuit includes logic gates (AND circuits) 2 to 7.

When the mask signal Tmask is normal (high level), the logic gates 2 to 7 pass the detection signals e1 to e6 outputted from the three edge detectors 122 and outputs them as the detection signal A4. On the other hand, in the periods in which the mask signal Tmask is active (low level), the logic gates 2 to 7 continuously output a low-level signal as the detection signal A4 without allowing the detection signals e1 to e6 outputted from the three edge detectors 122 to pass through.

Figure 10:
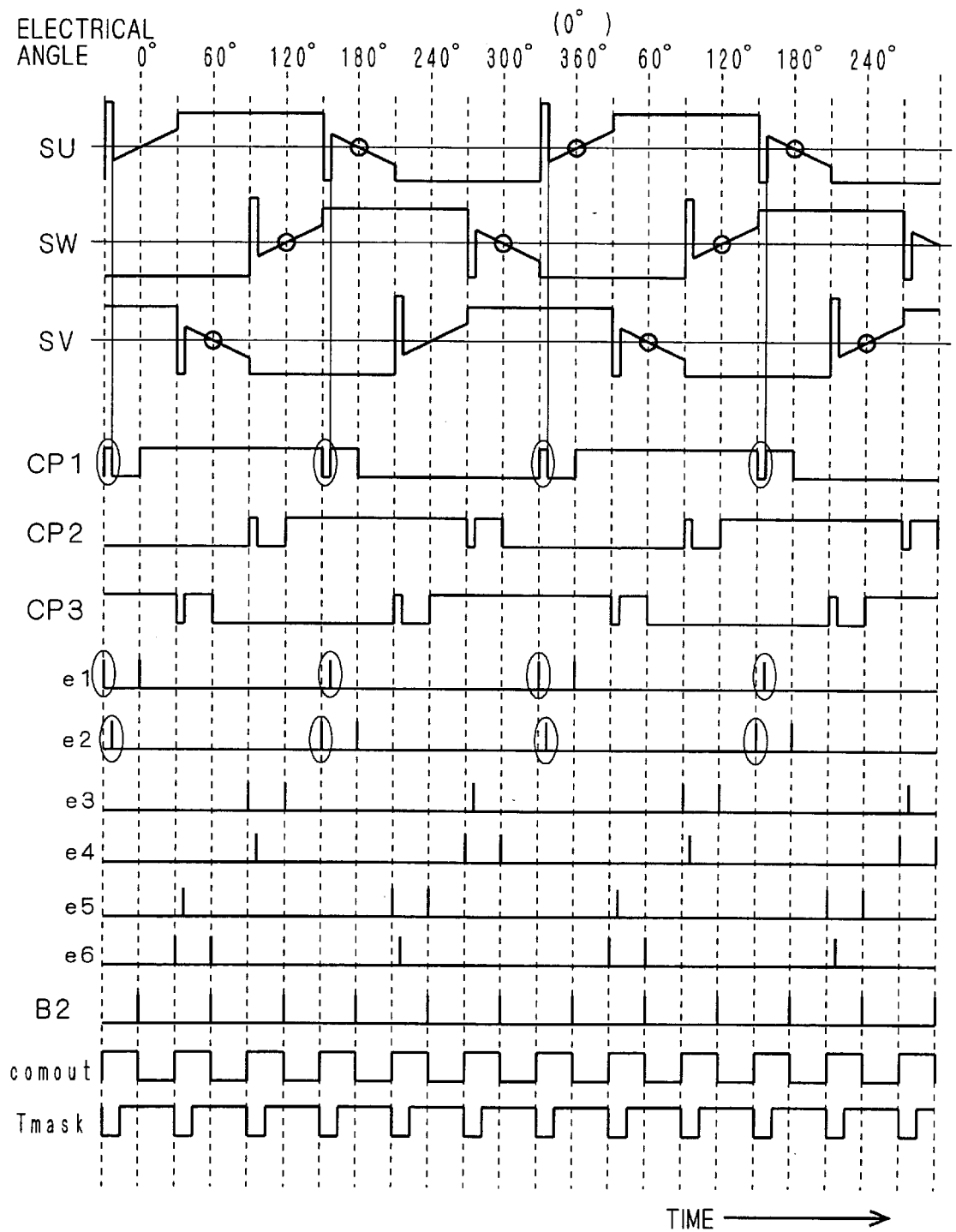
FIG. 10 is a timing chart showing operation of the apparatus of FIG. 7.

FIG. 10 is a timing chart showing the signals in individual parts of the apparatus 92 in the driving operation. As shown in FIG. 10, one of the induced voltages, SU, SV, SW induced at the terminals SU, SV, SW crosses the neutral voltage every time the electrical angle reaches 60°×k (the parts surrounded by the true circles in FIG. 10). In response, one of the detection signals e1 to e6 is outputted in pulse form. At the time when the current-supply pattern is switched, that is, when the electric angle coincides with 60°×k+30°, spike voltage appears in the induced voltages SU, SV, SW. The spike is reflected in the signals CP1 to CP3, and unwanted pulses appear due to the spike also in the detection signals e1 to e6 (the parts surrounded by the oval circles in FIG. 10).

However, when the electrical angle is in the range from 60°×k+30° to 60°×k+45°, the mask signal Tmask is active. Then, even if a pulse appears in the detection signals e1 to e6 in this electrical angle section, the pulse is not transferred to the detection signal A4. Similarly, the unwanted pulses are not transferred to the detection signal B2. Hence, as shown in FIG. 10, the effect of the spike voltage does not appear in the detection signal B2 (not shown but neither in the detection signal A4), and the crossing of the induced voltages SU, SV, SW and the neutral voltage is detected without error. Further, since the periods in which the detection signals e1 to e6 are masked are set in the given electrical angle section in the induced voltage detecting circuit 128, the erroneous detection prevention can be adapted to a wide range of rotating speeds.

While the comparator 304 refers to the value obtained by shifting the signal held in the register 111 for two bits to the right, it can generally refer to a value obtained by shifting it for m ($\geq 2$) bits. At this time, masking is effected in the electrical angle range from 60°×k+30° to 60°×k+30°+60°/$2^m$. Further, generally, the mask signal generating circuit can be constructed so that the mask signal Tmask is active when the electrical angle is in a given electrical angle section from 60°×k+60°×a to 60°×k+60°×b (a$\geq$½; ½<b) including 60°×k+30°. The above value "a" can be set as a=½ without any problem since the point at which a spike appears in the induced voltages SU, SV, SW is slightly delayed after the point at which the electrical angle reaches 60°×k+30° due to delay in the path from the output circuit 101 to the motor 201 and the like.

<Third Preferred Embodiment>

Figure 11:
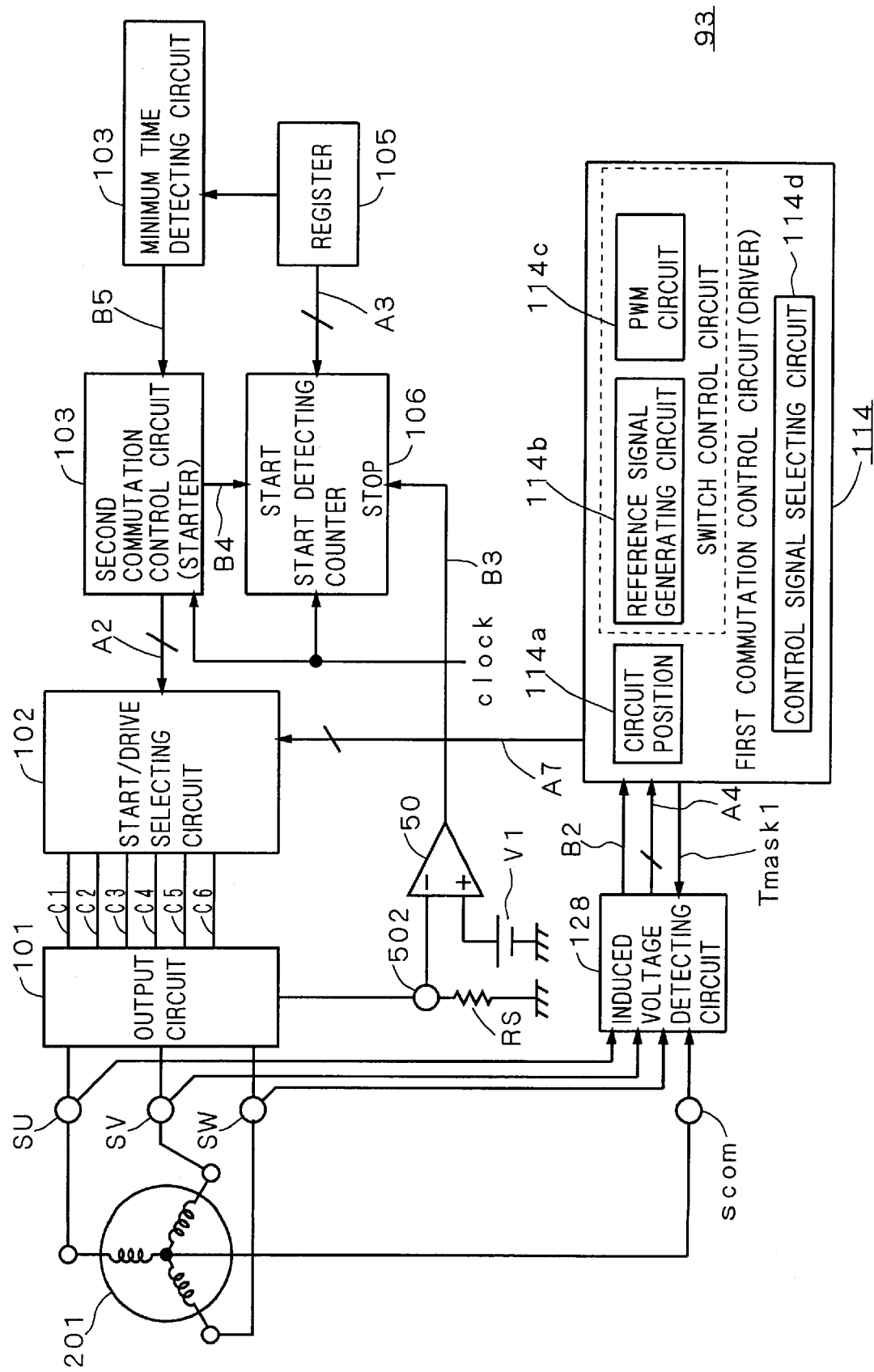
FIG. 11 is a block diagram showing an apparatus according to a third preferred embodiment.

FIG. 11 is a block diagram showing the structure of a motor driving apparatus according to a third preferred embodiment of the present invention. This apparatus 93 is characteristically different from the apparatus 92 of the second preferred embodiment in that is has a (first) commutation control circuit 114 in place of the commutation control circuit 109. The commutation control circuit 114 includes a circuit portion 114a, a reference signal generating circuit 114b, a PWM circuit 114c, and a control signal selecting circuit 114d. The commutation control circuit 114 is constructed to softly change the plurality of current-supply patterns in a given electrical angle section, instead of changing them instantaneously. The reference signal generating circuit 114b and the PWM circuit 114c are included in the switch control circuit of the invention.

Figure 12:
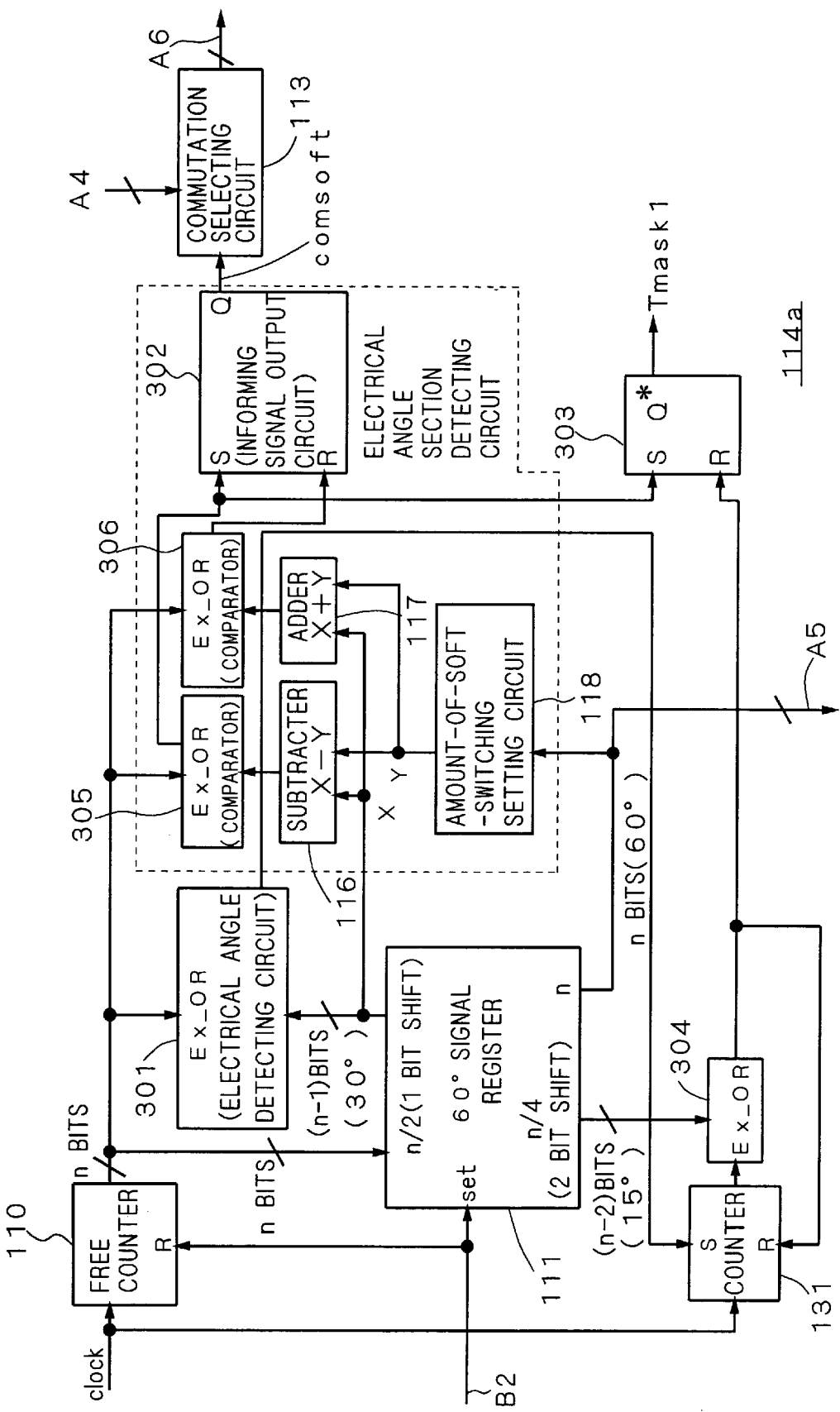
FIG. 12 is a block diagram showing the circuit portion 114a of FIG. 11.

FIG. 12 is a block diagram showing the internal structure of the circuit portion 114a. This circuit portion 114a characteristically differs from the commutation control circuit 109 shown in FIG. 8 in that it has an electrical angle section detecting circuit of the present invention. The comparator 301 is included in the electrical angle detecting circuit of the present invention. The amount-of-soft-switching setting circuit 118 calculates a certain ratio (<½) times the signal value held in the register 111 and outputs it as a signal Y. The signal Y is obtained by shifting the held signal for a certain number of bits to the right, for example.

The subtracter 116 subtracts the signal Y from a signal X obtained by shifting the held signal in the register 111 for one bit and outputs the subtracted value. The adder 117 adds the signal Y to the signal X and outputs the added value. The subtracted value corresponds to the electrical angle section of 30°−c° (0<c<30°) and the added value corresponds to the electrical angle section of 30°+c°.

The comparator 305 compares the count value of the counter 110 with the subtracted value, and it outputs a given signal (a high-level signal, for example) when the two values agree. Similarly, the comparator 306 compares the count value of the counter 110 with the added value, and it outputs a given signal (a high-level signal, for example) when the two values agree. Both of the comparators 305 and 306 can be constructed with an exclusive OR circuit, for example.

The SR latch 302 receives the output signal from the comparator 305 at its set input S and the output signal from the comparator 306 at its reset input R. Accordingly the informing signal comsoft outputted from the non-inverted output Q of the SR latch 302 is active (high level) when the electrical angle is in the range from 60°×k+30°−c° to 60°×k+30°+c°. The informing signal comsoft indicates the period for softly switching the current-supply pattern, i.e. the soft switching period.

The commutation selecting circuit 113 generates a control signal corresponding to a new current-supply pattern to be realized next for the present current-supply pattern, i.e. a current-supply pattern after switch, on the basis of the detection signal A4. It switches the control signal A6 from the value corresponding to the present current-supply pattern to the value corresponding to the current-supply pattern after switch at the time when the informing signal comsoft becomes active. Hence the control signal A6 is switched to a value corresponding to a new current-supply pattern every time the electrical angle reaches 60°×k+30°−c°. The control signal A6 is referred to by the reference signal generating circuit 114b and the control signal selecting circuit 114d described later.

The SR latch 303 receives the output signal from the comparator 305 at its set input S and the output signal from the comparator 304 at its reset input R. Accordingly the mask signal Tmask1 outputted from the inverted output Q* of the SR latch 303 is active (low level) while the electrical angle is in the range from 60°×k+30°−c° to 60°×k+45°. The mask signal Tmask1 is inputted to the induced voltage detecting circuit 128 shown in FIG. 9 in place of the mask signal Tmask.

The register 111 also outputs the held signal as a signal A5. This signal A5 is referred to by the reference signal generating circuit 114b described later.

Figure 13:
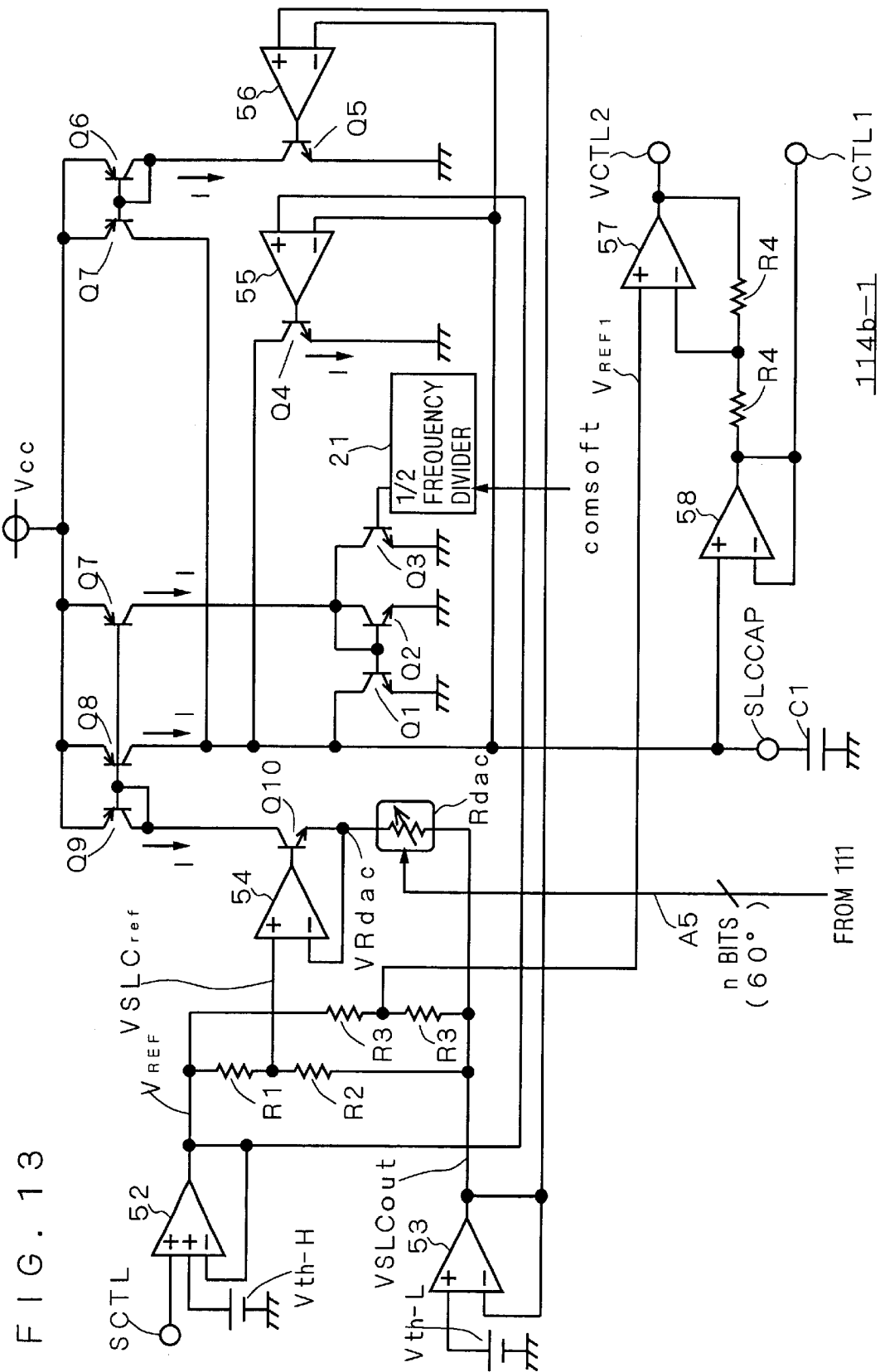
FIG. 13 is a circuit diagram showing part of the reference signal generating circuit of FIG. 11.

FIG. 13 is a block diagram showing the internal structure of part of the reference signal generating circuit 114b. The amplifier 52 is an amplifier with limiter, which outputs lower one of given voltage signals, a signal SCTL and a signal Vth-H, as a signal Vref. The amplifier 53 outputs a signal Vth-L, a voltage signal lower than the signal Vth-H, as a signal VSLCout.

The amplifier 54 and the transistor Q10 output a signal VSLCref obtained by dividing the potential difference between the signal Vref and the signal VSLCout with the resistor R1 and the resistor R2 as a signal VRdac. As a result, the given potential difference between the signal VRdac and the signal VSLCout is applied to the variable resistor Rdac.

Figure 14:
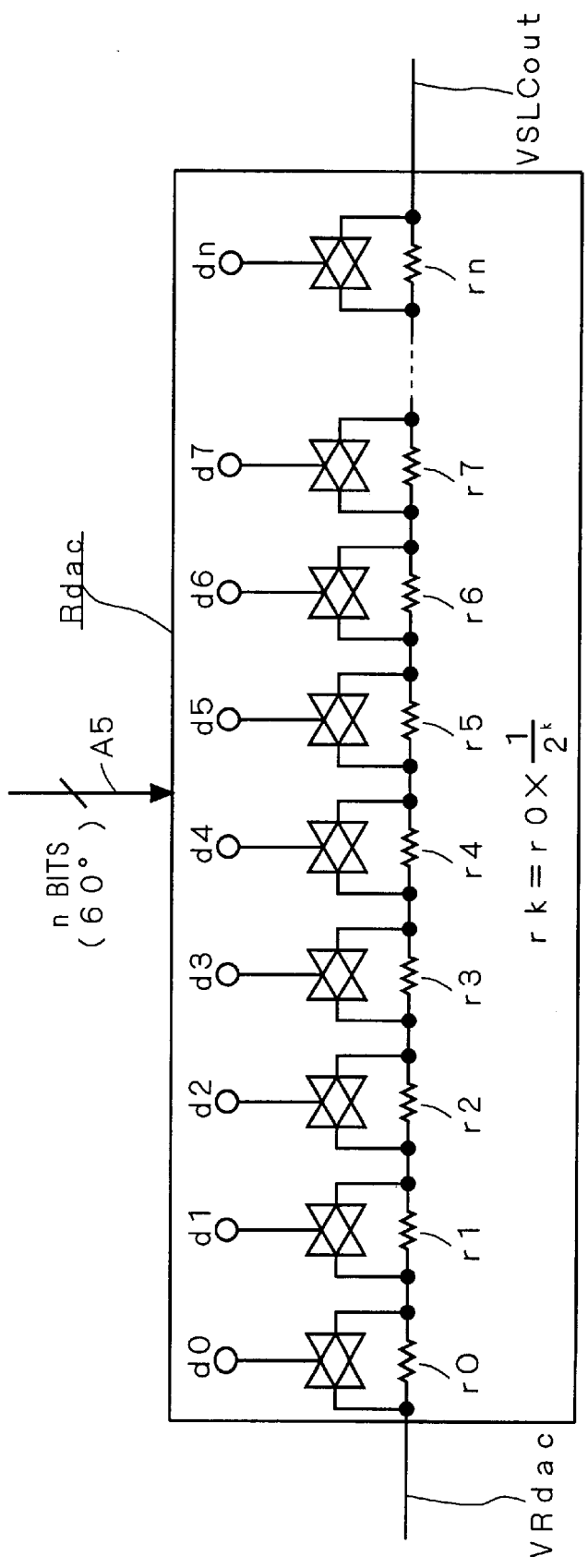
FIG. 14 is a circuit diagram showing the variable resistor of FIG. 13.

FIG. 14 is a circuit diagram showing the internal structure of the variable resistor Rdac. The variable resistor Rdac has resistance elements r0 to rn connected in series and switch elements d0 to dn respectively corresponding to the resistance elements r0 to rn. The resistance values of the resistance elements r0 to rn are given by $rk=r0\times\frac{1}{2}^k$ (k=0 to n). The switch elements d0 to dn turn on/off on the basis of the signal A5 which is a digital signal representing a binary number. Accordingly the resistance value of the variable resistor Rdac is proportional to the binary number represented by the signal A5.

Referring to FIG. 13 again, since the resistance value of the variable resistor Rdac is proportional to the value represented by the signal A5, the current I flowing in the variable resistor Rdac is in inverse proportion to the value represented by the signal A5. The current I is reflected in the transistors Q7 and Q8 by the transistors Q7 to Q9 forming a current mirror circuit. That is to say, a current of the same magnitude as the current I flowing in the transistor Q9 flows in the transistors Q7 and Q8.

The frequency dividing circuit 21 frequency-divides the informing signal comsoft to ½ times (i.e., by 2). When the frequency dividing circuit 21 outputs a signal at a low level, the current I flowing in the transistor Q7 does not flow in the transistor Q3 but it flows only in the transistor Q2. The transistor Q1 and the transistor Q2 form a current mirror circuit so that the magnitudes of the current are in the ratio of 2:1. Accordingly a current of a magnitude of 2×I flows in the transistor Q1. As a result, the capacitance element C1 is discharged with the current I.

On the other hand, when the frequency dividing circuit 21 outputs a signal at a high level, the current I flowing in the transistor Q7 flows only in the transistor Q3 and does not flow in the transistor Q2. Accordingly no current flows in the transistor Q1, and the capacitance element C1 is charged by the current I flowing in the transistor Q9. In this way, the signal SLCCAP or the voltage at one end of the capacitance element C1 alternately repeats rising and falling in each period of the informing signal comsoft.

The amplifier 55 and the transistor Q4 function as a limiter for limiting the signal SLCCAP at or under the signal Vref. Similarly, the amplifier 56 and the transistor Q5 function as a limiter limiting the signal SLCCAP at or over the signal Vth-L. Accordingly the signal SLCCAP is generated as a trapezoidal wave having a period twice that of the informing signal comsoft.

The amplifier 58 outputs the same voltage as the terminal SLCCAP as a signal VCTL1. The amplifier 57 outputs an inverse signal of the signal SLCCAP as a signal VCTL2, which is produced on the basis of the signal VREF1 obtained by the two resistors R3 by equally dividing the potential difference between the signal Vref and the signal Vth-L. Accordingly, as shown in FIG. 15, the signal VCTL1 and the signal VCTL2 are in opposite phases to each other.

While the period of the informing signal comsoft changes in proportion to the rotating period of the rotor, the resistance value of the variable resistor Rdac also changes in proportion to the rotating period of the rotor. Accordingly, when the values of the resistors R1, R2, R3, the value of the resistance element r0 of the variable resistor Rdac, the value of the signal SCTL and the like are set to most appropriate values, it is possible to always cause the signal SLCCAP to rise or fall between the signal Vth-L and the signal SCTL in the active periods of the informing signal comsoft, or in the periods in which soft switching should be done, without depending on the rotating period of the rotor.

Figure 16:
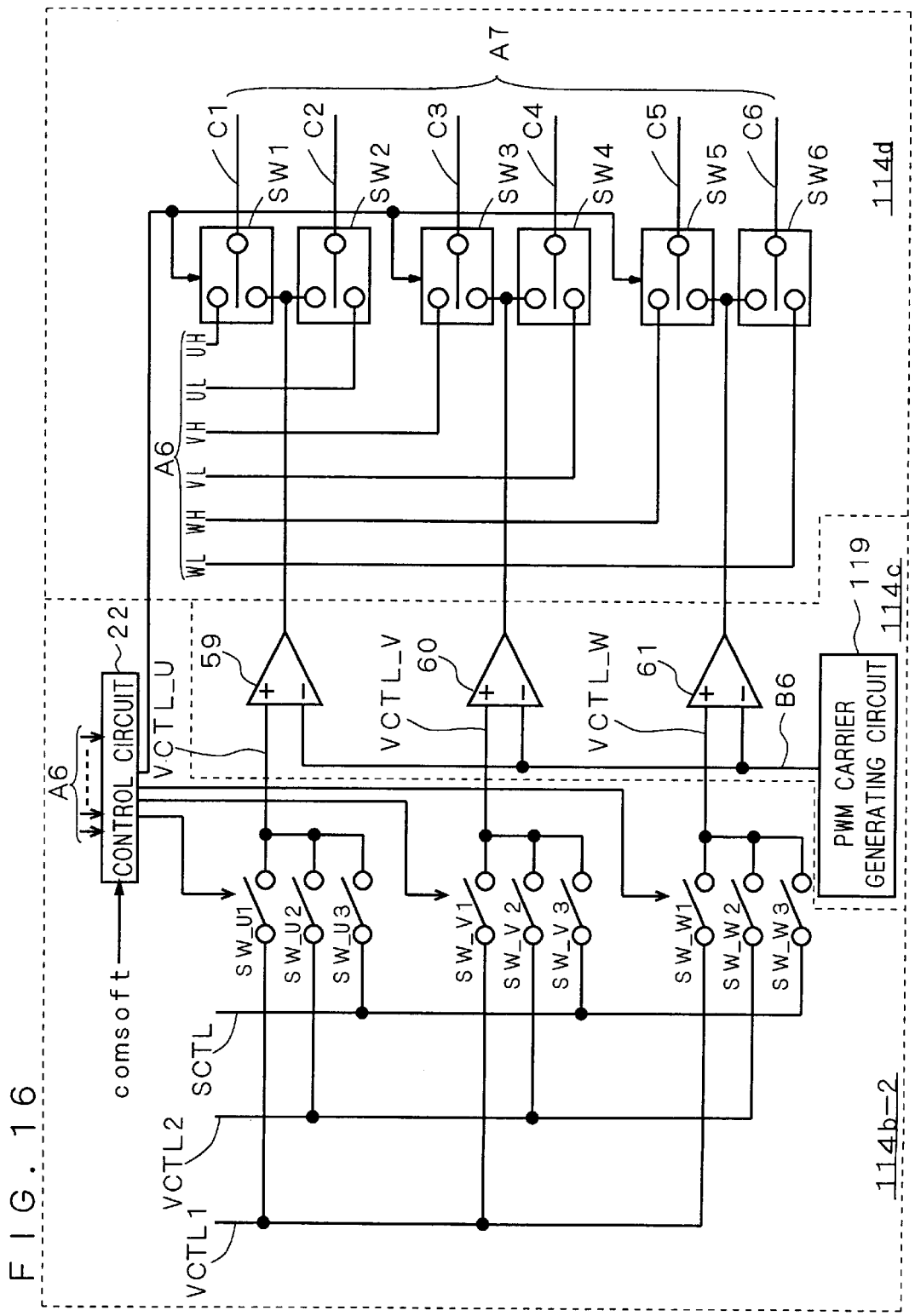
FIG. 16 is a block diagram showing part of the reference signal generating circuit, the PWM circuit, and the control signal selecting circuit of FIG. 11.

FIG. 16 is a block diagram showing the structure of the remaining part of the reference signal generating circuit 114b, the PWM circuit 114c, and the control signal selecting circuit 114d. The remaining part of the reference signal generating circuit 114b includes switch elements SW-U1 to SW-U3, SW-V1 to SW-V3, SW-W1 to SW-W3, and a control circuit 22. The PWM circuit 114c includes a carrier generating circuit 119 and comparators 59 to 61. The control signal selecting circuit 114d includes switch elements SW1 to SW6.

The control circuit 22 selectively turns on/off the switch elements SW-U1 to SW-U3, SW-V1 to SW-V3, and SW-W1 to SW-W3 on the basis of the control signal A6 to select one of the signals VCTL1, VCTL2 and SCTL as a signal to be inputted to the non-inverted inputs of the comparators 59 to 61. The carrier generating circuit 119 generates a carrier signal B6 for PWM control. When the informing signal comsoft is active, a triangular wave with short period is generated as the carrier signal B6, and when it is normal, a triangular wave with long period is generated. The comparators 59 to 61 each compare the signal inputted to the non-inverted input and the carrier signal B6 inputted to the inverted input and output a signal at a high level only when the former is higher than the latter.

The switch elements SW1 to SW6 select the output signals from the comparators 59 to 61 or the control signal A6 and send them to the selecting circuit 102 (FIG. 11) as the control signal A7. The control circuit 22 can control the switch elements SW1 to SW6 so that the output signals of the comparators 59 to 61 are always selected independently of the value of the informing signal comsoft. In this case, in periods in which the informing signal comsoft is active, the switch elements D1 to D6 in the output circuit 101 are PWM controlled with the short-period carrier signal B6 and soft switching is thus realized. In the periods in which the informing signal comsoft is normal, the switch elements D1 to D6 are PWM controlled with the long-period carrier signal B6.

On the other hand, the control circuit 22 can also control the switch elements SW1 to SW6 so that the output signals of the comparators 59 to 61 are selected only in the periods in which the informing signal comsoft is active. In this case, while soft switching is realized by the PWM control, the switch elements D1 to D6 are controlled on the basis of the control signal A6 without PWM control in the periods in which soft switching is not performed. In this way, the apparatus 93 is capable of performing and not performing PWM control in periods in which soft switching is not performed.

Figure 17:
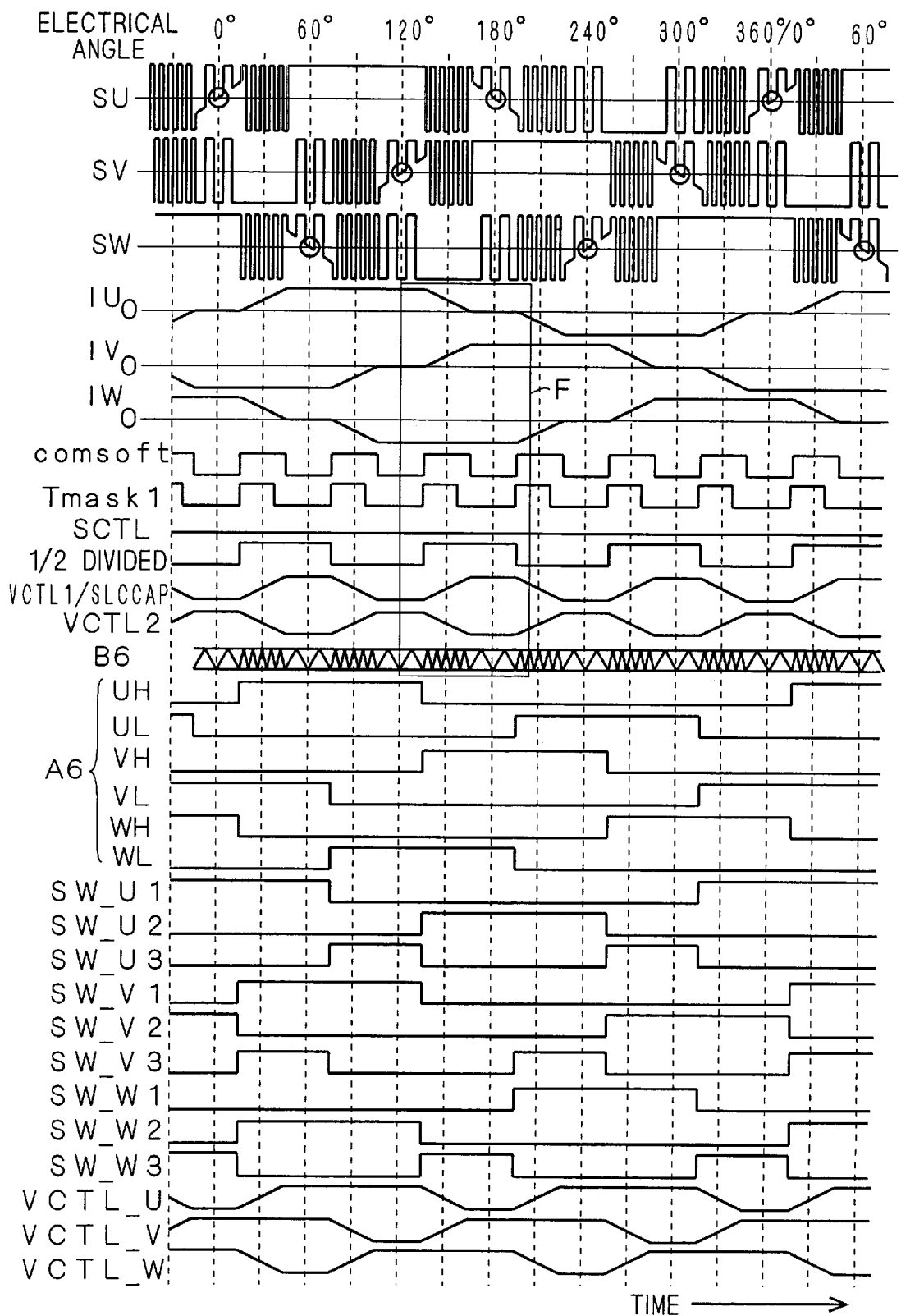
FIG. 17 is a timing chart showing operation of the apparatus of FIG. 11.

FIG. 17 is a timing chart showing the signals in the individual parts of the apparatus 93 in the driving operation. In the example of FIG. 17, the amount-of-soft-switching setting circuit 118 (FIG. 12) outputs a value corresponding to ¼ times the held signal in the register 111, i.e. a value corresponding to the electrical angle section of 15° as the signal Y. Hence soft switching is performed in the range of ±15° before and after the electrical angle 60°×k+30° at which the electrical angle further advanced by 30° after one of the induced voltages SU, SV, SW crossed the neutral voltage every time the electrical angle reaches 60°×k (the parts surrounded by the true circles in FIG. 17), that is, in the electrical angle section from 60°×k+15° to 60°×k+45°.

The informing signal comsoft is active (high level) in the electrical angle section from 60°×k+15° to 60°×k+45°. The signal VCTL1 and the signal VCTL2 are provided as trapezoidal waves in opposite phases, whose one period is equal to one period of the ½ divided signal of the informing signal comsoft. The signal VCTL1 and the signal VCTL2 rise and fall in the periods in which the informing signal comsoft is active. That is to say, the signal VCTL1 and the signal VCTL2 alternately realize a rising signal and a falling signal every time the informing signal comsoft becomes active. The carrier signal B6 is provided as a short-period triangular wave in the periods in which the informing signal comsoft is active and as a long-period triangular wave in the periods in which it is normal.

The control signal A6 changes to a value corresponding to the next current-supply pattern at the electrical angle 60°×k+15° at which the informing signal comsoft changes from normal to active. The control circuit 22 (FIG. 16) controls the switch elements SW-U1 to SWU3, SW-V1 to SW-V3, and SW-W1 to SW-W3 as shown in FIG. 17 on the basis of the control signal A6.

As a result, when one of the switch elements D1 and D4 (FIG. 2) connected to the terminal SU changes from OFF to ON as the current-supply pattern changes, the rising signal formed of the signal VCTL1 or the signal VCTL2 is selected in the active period of the informing signal comsoft as the signal VCTL-U inputted to the comparator 59 (FIG. 16). When one of the switch elements D1 and D4 changes from ON to OFF as the current-supply pattern changes, the falling signal formed of the signal VCTL1 or signal VCTL2 is selected as the signal VCTL-U in the active period of the informing signal comsoft. Further, when none of the switch elements D1 and D4 change operation as the current-supply pattern is changed, the constant signal SCTL is selected as the signal VCTL-U in the active period of the informing signal comsoft. The remaining signals VCTL-V and VCTL-W are selected in the same way.

Figure 18:
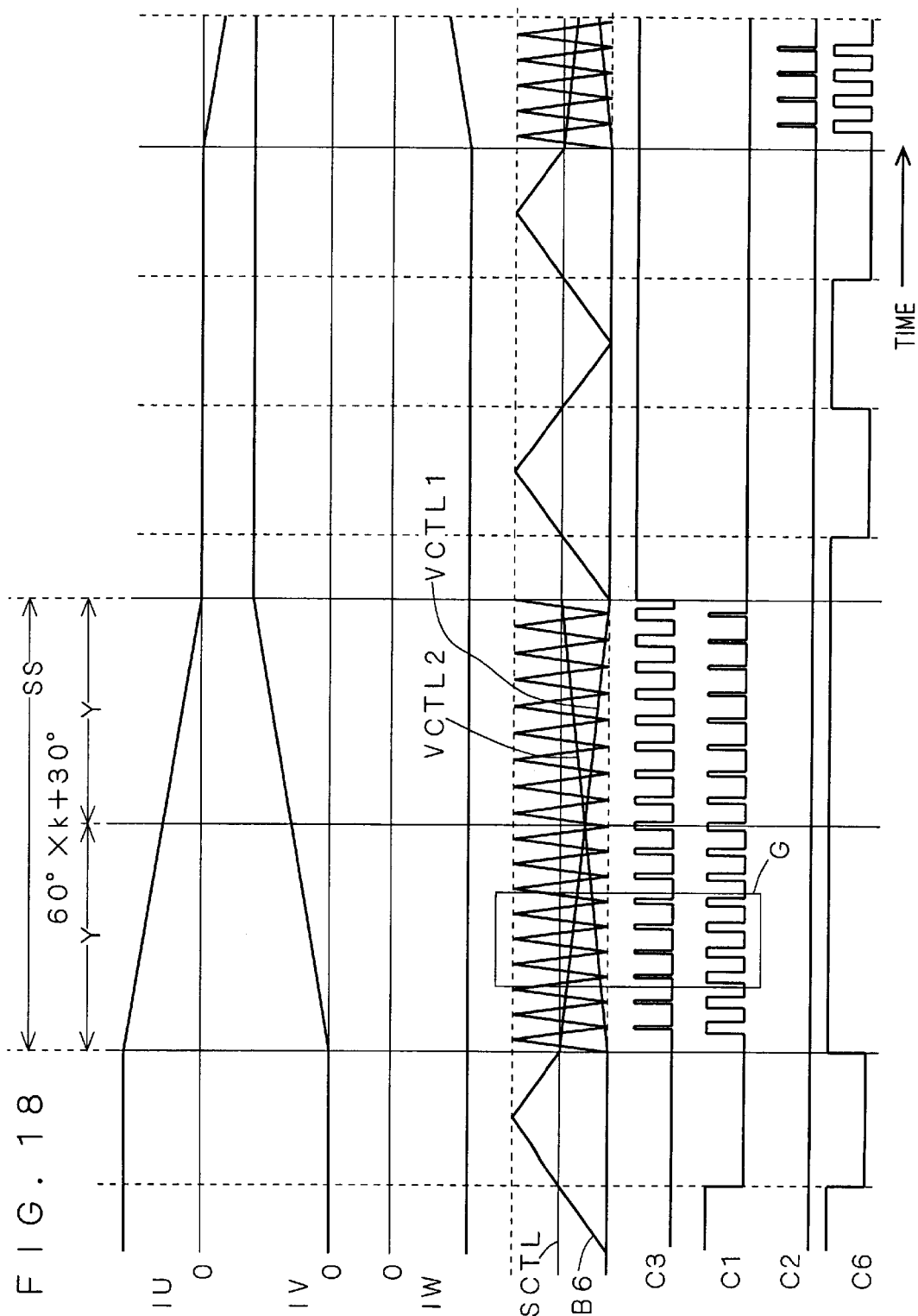
FIG. 18 is an enlarged diagram showing the part shown by the character F in FIG. 17.
Figure 19:
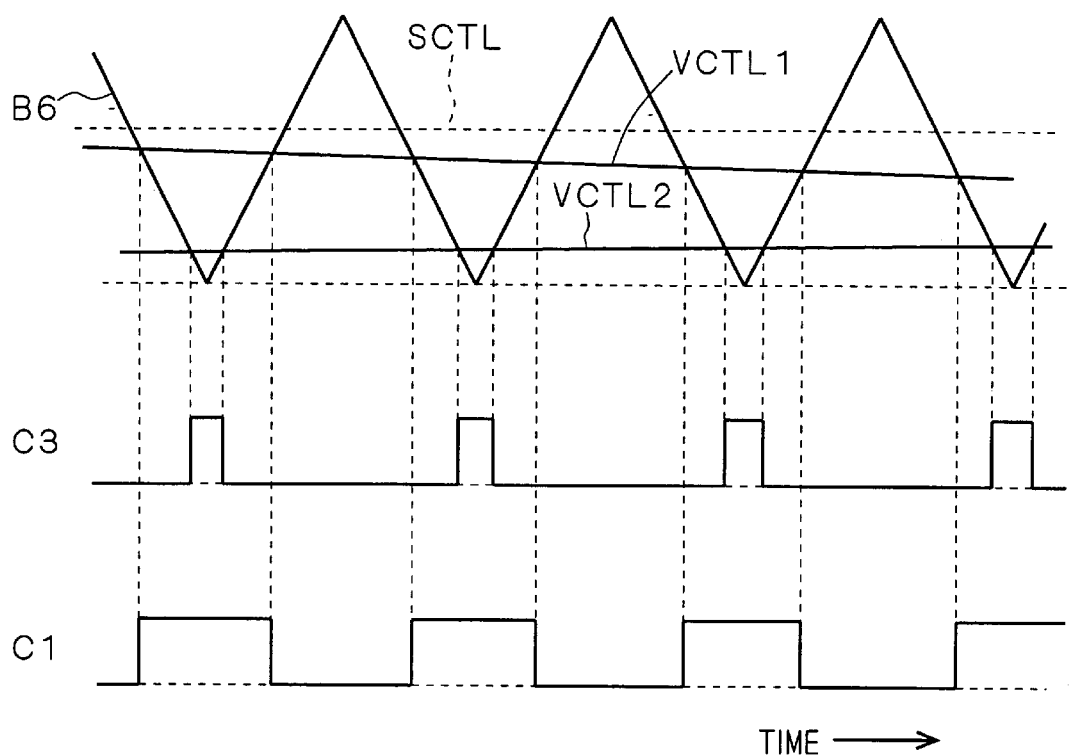
FIG. 19 is an enlarged diagram showing the part shown by the character G in FIG. 18.

FIG. 18 is a timing chart showing the part shown by the character F in FIG. 17 in an enlarged manner, and FIG. 19 is a timing chart showing the part shown by the character G in FIG. 18 in an enlarged manner. Before and after the electrical angle section SS in which soft switching is done, the switch element D1 connected to the terminal SU changes from ON to OFF and the switch element D3 connected to the terminal SV changes from OFF to ON. The operation of the other switch elements D2, D4 to D6 is not changed.

Then, as shown in FIG. 19, the control signal C1 (FIG. 16) controlling the switch element D1 is PWM controlled by the carrier signal B6 and the signal VCTL1 forming a falling signal in this period and it is generated as repetitive pulses with decreasing duty. The control signal C3 (FIG. 16) controlling the switch element D3 is PWM controlled by the carrier signal B6 and the signal VCTL2 forming a rising signal in this period and generated as repetitive pulses with increasing duty.

That is to say, the control signals C1 and C3 are generated in the form of repeated pulses with their respective duties varying so that the time ratio of the current-supply pattern before switching decreases and the time ratio of the current-supply pattern after switching increases in the electrical angle section SS. As a result, as shown in FIG. 18, the current IU softly decreases from the high value corresponding to the current-supply pattern before switching to zero corresponding to the current-supply pattern after switching in the electrical angle section SS. The current IV softly increases from zero corresponding to the current-supply pattern before switching to the high value corresponding to the current-supply pattern after switching in the electrical angle section SS.

In this way, the apparatus 93 performs soft switching when the current-supply pattern changes, so that the acoustic noise can be reduced. Moreover, since the soft switching is performed in the given electrical angle section, the reduction of acoustic noise can be adapted to a wide range of rotating speeds. Further, since the soft switching is realized by PWM control, it can perform PWM control like a conventional PWM control type motor driving apparatus also in the periods other than the soft switching periods, and the power of the motor 201 can be freely controlled.

Referring to FIG. 17 again, the mask signal Tmask1 is active (low level) when the electrical angle is in the range from 60°×k+15° to 60°×k+45°. In this period, the detecting operation of the induced voltage detecting circuit 128 (FIG. 9) is masked. In the apparatus 93 performing soft switching, spike voltage appears in the induced voltages SU, SV, SW at the points at which the soft switching is started (not shown). Moreover, the spike voltage is slightly delayed after the point at which the informing signal comsoft rises because of effect of the signal propagation delay between the output circuit 101 and the motor 201. Accordingly no problem arises when the mask signal Tmask1 becomes active at the same time as the rise of the informing signal comsoft.

Oscillations due to PWM control appear in the induced voltages SU, SV, SW as well as the spike voltage. However, the effect of oscillations on the detecting operation of the induced voltage detecting circuit 128 can be removed easily.

<Fourth Preferred Embodiment>

Figure 20:
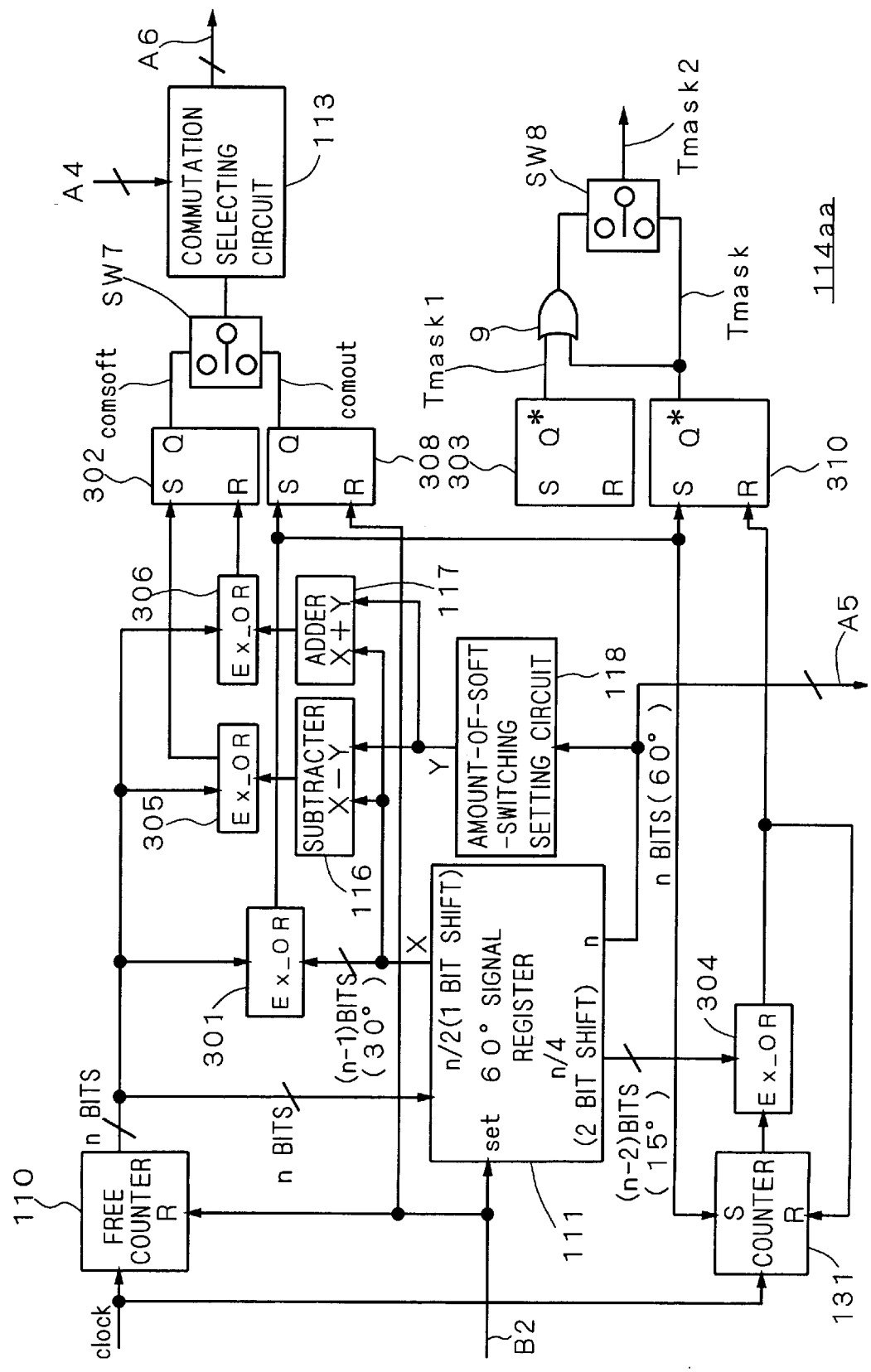
FIG. 20 is a block diagram showing an apparatus according to a fourth preferred embodiment.

FIG. 20 is a block diagram showing part of a motor driving apparatus according to a fourth preferred embodiment of the present invention. The motor driving apparatus of the fourth preferred embodiment characteristically differs in structure from the apparatus 93 of the third preferred embodiment in that it has a circuit portion 114aa of FIG. 20 in place of the circuit portion 114a (FIG. 12). This selectively realizes the operation of the apparatus 93 of the third preferred embodiment and the operation of the apparatus 92 of the second preferred embodiment.

The circuit portion 114aa characteristically differs from the circuit portion 114a (FIG. 12) in that it additionally includes SR latches 308 and 310, signal selecting circuits SW7 and SW8, and an OR circuit 9. The SR latch 308 is set by the output signal of the comparator 301 and reset by the detection signal B2. Accordingly the SR latch 308 generates the signal comout in the first and second preferred embodiments. The signal selecting circuit SW7 selects the informing signal comsoft outputted from the SR latch 302 or the signal comout outputted from the SR latch 308 on the basis of an external signal and sends it to the commutation selecting circuit 113.

The SR latch 310 is set by the output signal of the comparator 301 and reset by the output signal of the comparator 304. Accordingly the SR latch 310 generates the mask signal Tmask in the second preferred embodiment. The signal selecting circuit SW8 selects logical OR of the mask signal Tmask1 and the mask signal Tmask outputted from the OR circuit 9 or the mask signal Tmask on the basis of the external signal and sends it to the induced voltage detecting circuit 128 as the mask signal Tmask2.

Figure 21:
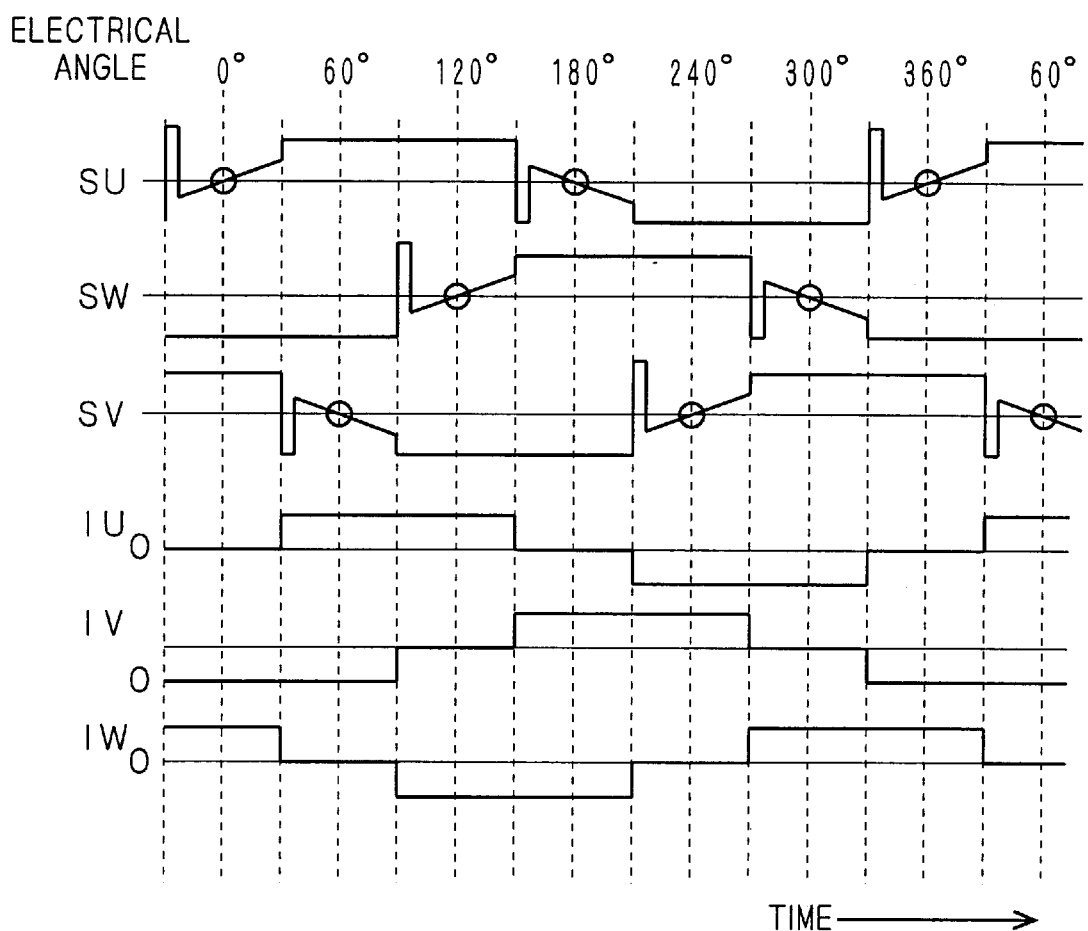
FIG. 21 is a timing chart showing operation of the apparatus of FIG. 20.

The external signal is also inputted to the control circuit 22 in the reference signal generating circuit 114b (FIG. 16). When the signal selecting circuits SW7 and SW8 respectively select the signal comout and the mask signal Tmask on the basis of the external signal, the switch elements SW1 to SW6 always select the control signal A6 as directed by the control circuit 22. Signals in individual parts of the motor driving apparatus in this case are shown in the timing chart of FIG. 21. That is to say, neither soft switching nor PWM control is performed.

As described above, the motor driving apparatus of the fourth preferred embodiment selectively realizes the operation of the apparatus 93 of the third preferred embodiment and the operation of the apparatus 92 of the second preferred embodiment on the basis of the external signal. Thus quiet operation with reduced acoustic noise and operation of giving maximum power to the motor 201 can be selectively realized as needed.

While the invention has been described in detail, the foregoing description is in all aspects illustrative and not restrictive. It is understood that numerous other modifications and variations can be devised without departing from the scope of the invention.

What is claimed is:

1. A motor driving apparatus for driving a motor by sequentially switching among a plurality of current-supply patterns in accordance with electrical angle of a rotor, comprising:

an output circuit having a plurality of switch element individually interposed between a plurality of terminals of said motor, and first and second power-supply lines;

a detection control circuit for controlling said plurality of switch elements to sequentially switch among said plurality of current-supply patterns while said rotor is resting;

a current detecting circuit for detecting current flowing through said plurality of terminals;

a position detecting circuit for detecting stop position of said rotor on the basis of rate of change in said current for each of said plurality of current-supply patterns; and a starting control circuit for selecting one of said plurality of current-supply patterns as a current-supply pattern for starting on the basis of said stop position and controlling said plurality of switch elements to realize said selected current-supply pattern.

2. The motor driving apparatus according to claim 1, wherein said position detecting circuit comprises;

a counter which starts counting a clock signal as each one of said plurality of current-supply patterns starts and stops said counting every time said current reaches a reference value, a register for holding a plurality of count values which said counter indicates after stopping respectively in correspondence with said plurality of current-supply patterns, and a position determining circuit for determining the stop position of said rotor on the basis of said plurality of held count values.

3. The motor driving apparatus according to claim 2, wherein said position determining circuit determines said stop position of said rotor on the basis of which of said plurality of current-supply patterns corresponds to a maximum or minimum value among said plurality of held count values.

4. A motor driving apparatus for driving a motor by sequentially switching among a plurality of current-supply patterns in accordance with electrical angle of a rotor, comprising:

an output circuit having a plurality of switch elements individually interposed between a plurality of terminals of said motor, and first and second power-supply lines;

an induced voltage detecting circuit for outputting a detection signal for informing that any one of a plurality of included voltages induced respectively at said plurality of terminals crosses neutral voltage of said motor; and a commutation control circuit for controlling said plurality of switch elements to sequentially switch among said plurality of current-supply patterns on the basis of said detection signal and detecting whether said electrical angle is located in a given electrical angle section including an electrical angle at which said plurality of current-supply patterns are switched;

wherein said induced voltage detecting circuit ceases output of said detection signal in said electrical angle section.

5. The motor driving apparatus according to claim 4, wherein said commutation control circuit comprises;

a counter for counting a clock signal and which resets its count value on the basis of said detection signal every time any of said plurality of induced voltages crosses said neutral voltage, a register which updates its held signal every time said count value is reset with said count value immediately before reset, an electrical angle detecting circuit for comparing said count value and a first ratio (<1) times said held signal and outputting a signal when the two agree, a commutation selecting circuit for selecting a current-supply pattern to be realized after switching among said plurality of current-supply patterns on the basis of said detection signal and controlling said plurality of switch elements so as to switch to said selected current-supply pattern in synchronization with said signal outputted from said electrical angle detecting circuit, and a mask signal generating circuit for outputting a mask signal in a period in which said count value is between a second ratio (≦the first ratio) times said held signal and a third ratio (>the first ratio) times said held signal, and wherein said induced voltage detecting circuit ceases output of said detection signal in a period in which said mask signal is outputted.

6. The motor driving apparatus according to claim 5, wherein said induced voltage detecting circuit comprises;

a plurality of comparators for comparing said plurality of induced voltages individually with said neutral voltage and outputting the results of comparison, a plurality of edge detectors for individually detecting changes in outputs from said plurality of comparators and outputting results of detection as said detection signal, and a logic gate interposed between said plurality of edge detectors and said commutation control circuit, for passing said detection signal outputted from said edge detectors only when said mask signal is not outputted.

7. The motor driving apparatus for driving a motor by sequentially switching among a plurality of current-supply patterns in accordance with electrical angle of a rotor, comprising:

an output circuit having a plurality of switch elements individually interposed between a plurality of terminals of said motor and first and second power-supply lines; and a commutation control circuit for controlling said plurality of switch elements to sequentially switch among said plurality of current-supply patterns, wherein said commutation control circuit comprises, an electrical angle section detecting circuit for detecting a given electrical angle section extending before and after switching of said plurality of current-supply patterns, and a switch control circuit for generating and outputting a signal in a form of pulses repetitively changing between a first value corresponding to a current-supply pattern before said switching and a second value corresponding to a current-supply pattern after said switching with their duties so changed that time ratio of said first value decreases and time ratio of said second value increases, in said electric angle section, as a signal for controlling a switch element whose operation changes between before and after said switching among said plurality of switch elements.

8. The motor driving apparatus according to claim 7, further comprising an induced voltage detecting circuit for outputting a detection signal for informing that any one of a plurality of induced voltages induced respectively at said plurality of terminals crosses neutral voltage of said motor, wherein said commutation control circuit further comprises:

a counter for counting a clock signal and which resets its count value on the basis of said detection signal every time any of said plurality of induced voltages crosses said neutral voltage, a register which updates its held signal every time said count value is reset with said count value immediately before reset, and a commutation selecting circuit for sequentially switching and outputting a plurality of control signals for respectively controlling said plurality of switch elements, corresponding to said plurality of current-supply patterns, and wherein said electrical angle section detecting circuit comprises;

a first calculating unit for calculating a first ratio (<1) times said held signal, a second calculating unit for calculating a second ratio (said first ratio<said second ratio<1) times said held signal, a first comparator for comparing said count value and said first ratio times said held signal, a second comparator for comparing said count value and said second ratio times said held signal, and an informing signal output circuit for outputting an informing signal for informing that said electrical angle is in said electrical angle section in period from when said count value reaches said first ratio times said held signal to when said count value reaches said second ratio times said held signal on the basis of results of comparison made by said first and second comparators, and wherein said commutation selecting circuit selects a current-supply pattern to be realized after switching from among said plurality of current-supply patterns on the basis of said detection signal and updates said plurality of control signals to be outputted from said plurality of control signals corresponding to said current-supply pattern before switching to said plurality of control signals corresponding to said current-supply pattern after switching in synchronization with the beginning of output of said informing signal, and said switch control circuit operates regarding a period in which said informing signal is outputted as said electric angle section, a value of a control signal for said switch element whose operation changes between before and after said switching among said plurality of control signals corresponding to a current-supply pattern before said switching as said first value, and a value of a control signal for said switch element whose operation changes between before and after said switching among said plurality of control signals corresponding to a current-supply pattern after said switching as said second value.

9. The motor driving apparatus according to claim 8, wherein said switch control circuit comprises;

a reference signal generating circuit for generating a rising signal and a falling signal which rises and falls in said period in which said informing signal is outputted, and a PWM circuit, which includes a carrier generating circuit for generating a carrier signal as a periodically repeating triangular wave, for comparing a reference signal selected from said rising signal and said falling signal with said carrier signal in said period in which said informing signal is outputted, and changing said signal in a form of pulses so as to have said first value when one of the two compared is larger and said second value when the other is larger.

10. The motor driving apparatus according to claim 9, wherein said reference signal generating circuit comprises;

a variable resistor whose resistance value is proportional to said held signal, a circuit for applying a given voltage to said variable resistor, a capacitance element, a circuit for repeatedly charging and discharging said capacitance element with a current whose magnitude is proportional to current flowing in said variable resistor, and a circuit for sending one and the other of signals respectively proportional to a voltage signal held in said capacitance element and its inversion signal to said PWM circuit as said rising signal and said falling signal.

11. The motor driving apparatus according to claim 7, wherein said commutation control circuit further comprises another electrical angle section detecting circuit for detecting whether said electrical angle is located in another given electrical angle section including the beginning of said electrical angle section, and wherein said induced voltage detecting circuit ceases output of said detection signal in said another electrical angle section.

12. The motor driving apparatus according to claim 8, wherein said commutation control circuit further comprises a control signal selecting circuit interposed between said switch control circuit and said plurality of switch elements, for selectively sending signals outputted from said switch control circuit and said plurality of control signals outputted from said commutation selecting circuit to said plurality of switch elements.

13. The motor driving apparatus according to claim 12, wherein said commutation control circuit further comprises;

an electrical angle detecting circuit for comparing said count value of said counter and a third ratio (said first ratio<said third ratio<said second ratio) times said held signal and outputting an electrical angle detection signal when the two agree, and a signal selecting circuit for selectively sending said informing signal and said electrical angle detection signal to said commutation selecting circuit, and said commutation selecting circuit updates said plurality of control signals in synchronization selectively with beginning of output of said informing signal or said electrical angle detection signal sent from said signal selecting circuit.

\* \* \* \* \*